(12) United States Patent
Tobiason et al.

(10) Patent No.: US 10,295,648 B2
(45) Date of Patent: *May 21, 2019

(54) CONTAMINATION AND DEFECT RESISTANT OPTICAL ENCODER CONFIGURATION INCLUDING A NORMAL OF READHEAD PLANE AT A NON-ZERO PITCH ANGLE RELATIVE TO MEASURING AXIS FOR PROVIDING DISPLACEMENT SIGNALS

(71) Applicant: Mitutoyo Corporation, Kawasaki-shi, Kanagawa-ken (JP)

(72) Inventors: Joseph Daniel Tobiason, Bothell, WA (US); Norman Laman, Kirkland, WA (US); Akihide Kimura, Tokorozawa (JP); Shu Hirata, Kawasaki (JP)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,135

(22) Filed: Mar. 30, 2018

(65) Prior Publication Data

US 2019/0004142 A1    Jan. 3, 2019

Related U.S. Application Data

(63) Continuation-in-part of application No. 15/858,218, filed on Dec. 29, 2017, which is a
(Continued)

(51) Int. Cl.
*G01D 5/347* (2006.01)
*G01S 3/783* (2006.01)
(Continued)

(52) U.S. Cl.
CPC ........ *G01S 3/7835* (2013.01); *G01D 5/24476* (2013.01); *G01D 5/34715* (2013.01); *G01S 3/781* (2013.01)

(58) Field of Classification Search
CPC ........... G01D 5/34715; G01D 5/34792; G01D 5/347; G01D 5/3473; G01D 5/34761; G01D 5/34707
(Continued)

(56) References Cited

U.S. PATENT DOCUMENTS 3,882,482 A    5/1975  Green et al.
4,109,389 A    8/1978  Balcom et al.
(Continued)

FOREIGN PATENT DOCUMENTS

EP    2 367 058 A1    9/2011
JP    2003-65803 A    3/2003
WO    2 562 568 A1    2/2013

OTHER PUBLICATIONS

Canon, "Laser Rotary Encoder," Product Data Sheet, New LRE Catalog corrected 1117 2012, 2012, 12 pages.
(Continued)

*Primary Examiner* — Que Tan Le
(74) *Attorney, Agent, or Firm* — Seed IP Law Group LLP

(57) ABSTRACT

An optical encoder configuration comprises a scale, an illumination source, and a photodetector configuration. The illumination source is configured to output structured illumination to the scale. The scale extends along a measuring axis direction and is configured to output scale light that forms a detector fringe pattern comprising periodic high and low intensity bands that extend over a relatively longer dimension along the measuring axis direction and are relatively narrow and periodic along a detected fringe motion direction transverse to the measuring axis direction. The
(Continued)

high and low intensity bands move along the detected fringe motion direction transverse to the measuring axis direction as the scale grating displaces along the measuring axis direction. The photodetector configuration is configured to detect a displacement of the high and low intensity bands along the detected fringe motion direction and provide respective spatial phase displacement signals that are indicative of the scale displacement.

9 Claims, 15 Drawing Sheets

Related U.S. Application Data continuation-in-part of application No. 15/702,520, filed on Sep. 12, 2017, which is a continuation-in-part of application No. 15/637,750, filed on Jun. 29, 2017, now Pat. No. 10,168,189.

(51) Int. Cl.
  *G01S 3/781* (2006.01)
  *G01D 5/244* (2006.01)
(58) Field of Classification Search
  USPC .......................................... 250/231.13, 239
  See application file for complete search history.

(56) References Cited

U.S. PATENT DOCUMENTS

| | | | |
|---|---|---|---|
| 4,414,754 A | | 11/1983 | Lapeyre |
| 4,964,727 A | | 10/1990 | Huggins |
| 5,010,655 A | | 4/1991 | Rieder et al. |
| 5,237,391 A | | 8/1993 | Huggins |
| 5,239,178 A | * | 8/1993 | Derndinger .............. G01B 9/04 250/234 |
| 5,279,044 A | | 1/1994 | Bremer |
| 5,442,166 A | | 8/1995 | Hollmann |
| 5,773,820 A | | 6/1998 | Osajda et al. |
| 5,774,219 A | | 6/1998 | Matsuura |
| 5,886,519 A | | 3/1999 | Masreliez et al. |
| 5,965,879 A | | 10/1999 | Leviton |
| 8,345,259 B2 | | 1/2013 | Parriaux et al. |
| 8,493,572 B2 | | 7/2013 | Milvich |
| 8,941,052 B2 | | 1/2015 | Xie et al. |
| 9,018,578 B2 | | 4/2015 | Tobiason et al. |
| 9,029,757 B2 | | 5/2015 | Tobiason |
| 9,080,899 B2 | | 7/2015 | Tobiason |
| 2019/0033100 A1 | | 1/2019 | Tobiason |

OTHER PUBLICATIONS

Tonchev et al., "Cylindrical Grating Projection by Single-Shot Normal Exposure of a Radial Phase Mask," *IEEE Photonics Journal* 4(4):1170-1177, 2012 (9 pages).
Wu et al., "Common-path laser planar encoder," *Optics Express* 21(16):18872-18883, 2013.

\* cited by examiner

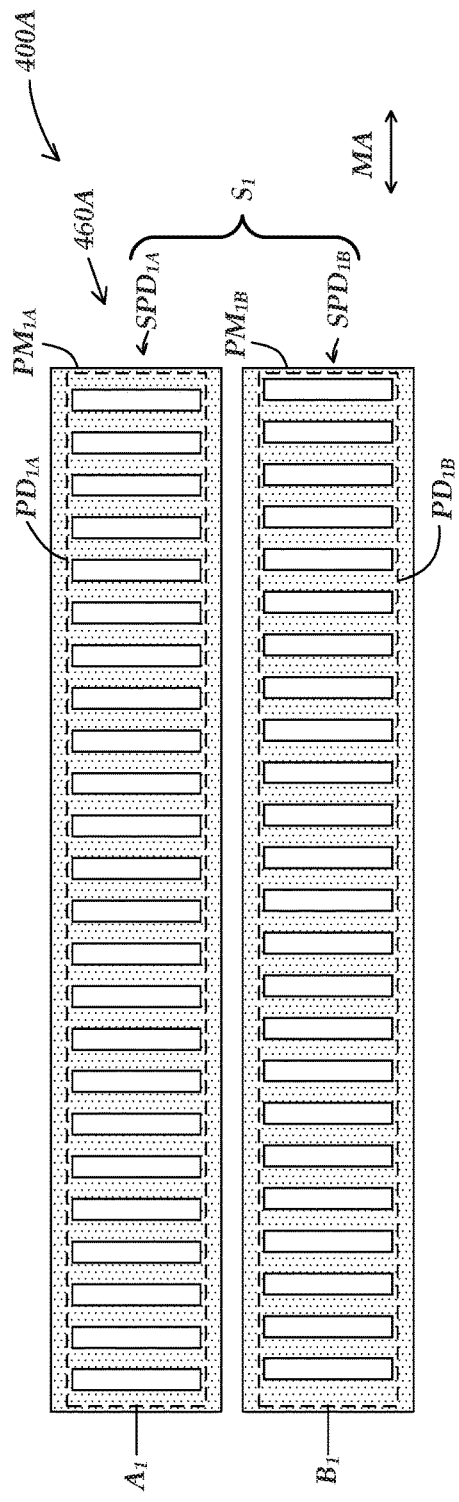
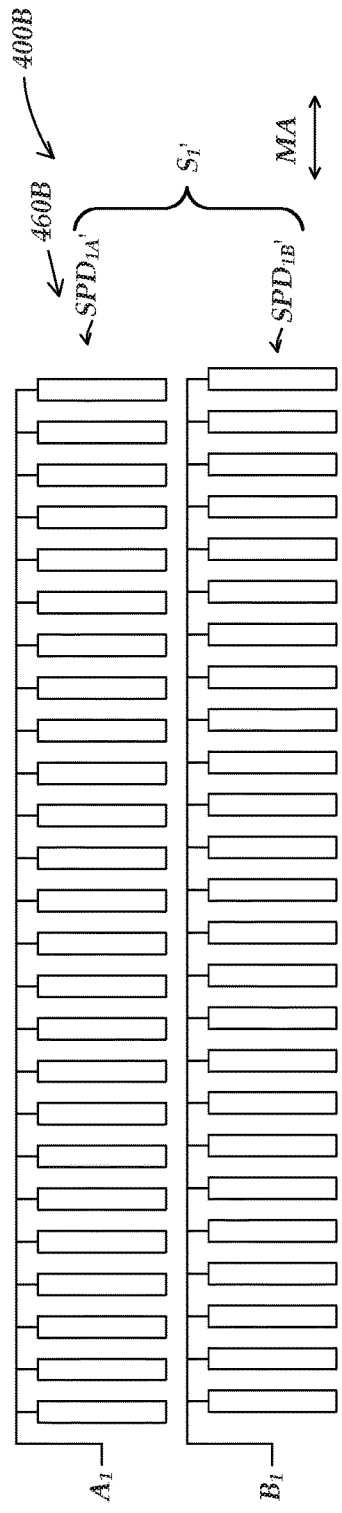
Fig. 4A.
Fig. 4B.

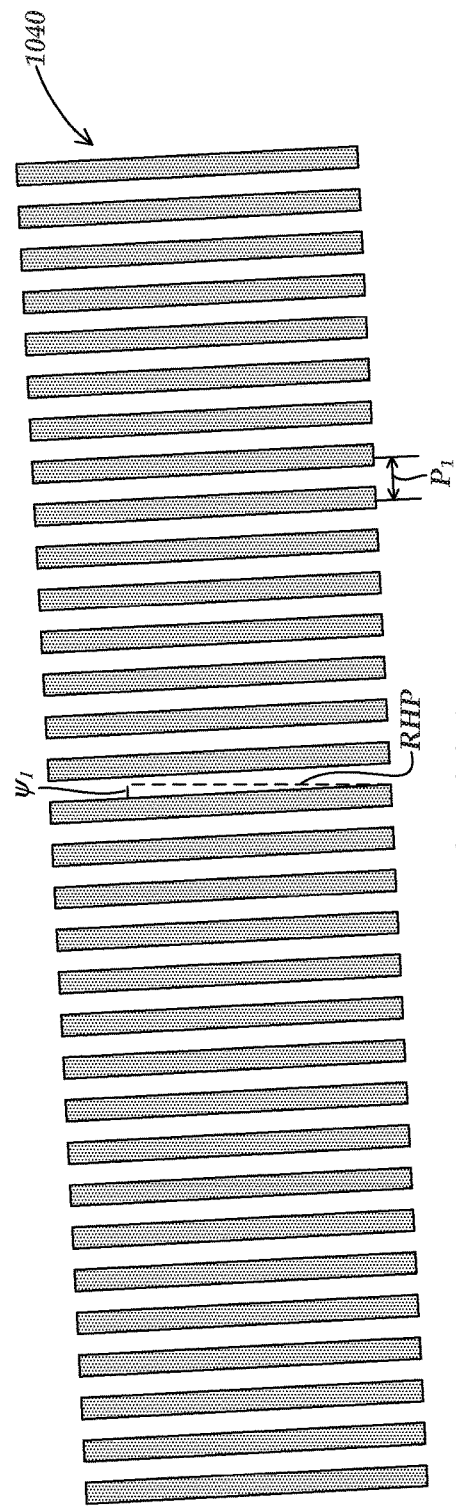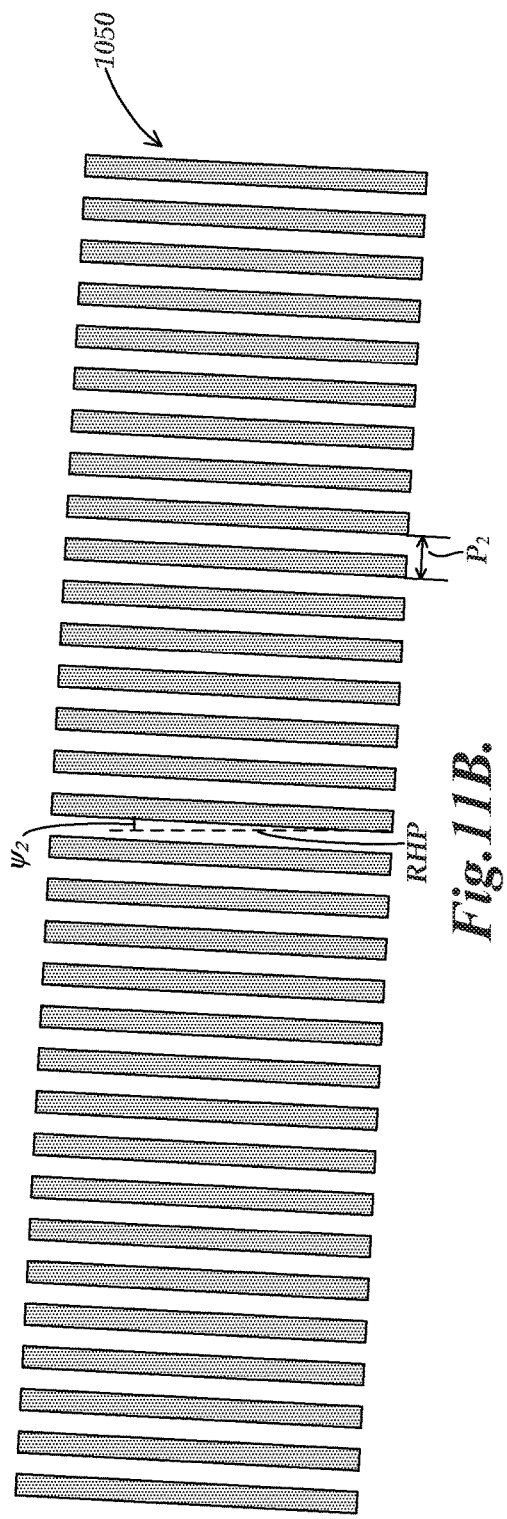

CONTAMINATION AND DEFECT RESISTANT OPTICAL ENCODER CONFIGURATION INCLUDING A NORMAL OF READHEAD PLANE AT A NON-ZERO PITCH ANGLE RELATIVE TO MEASURING AXIS FOR PROVIDING DISPLACEMENT SIGNALS

CROSS-REFERENCE TO RELATED APPLICATION(S)

This application is a continuation-in-part of U.S. patent application Ser. No. 15/858,218, entitled "CONTAMINATION AND DEFECT RESISTANT OPTICAL ENCODER CONFIGURATION FOR PROVIDING DISPLACEMENT SIGNALS," filed Dec. 29, 2017; which is a continuation-in-part of U.S. patent application Ser. No. 15/702,520, entitled "CONTAMINATION AND DEFECT RESISTANT OPTICAL ENCODER CONFIGURATION FOR PROVIDING DISPLACEMENT SIGNALS," filed Sep. 12, 2017; which is a continuation-in-part of U.S. patent application Ser. No. 15/637,750, entitled "CONTAMINATION AND DEFECT RESISTANT OPTICAL ENCODER CONFIGURATION FOR PROVIDING DISPLACEMENT SIGNALS," filed Jun. 29, 2017, the disclosures of which are hereby incorporated herein by reference in its entirety.

BACKGROUND

Technical Field

The invention relates generally to precision position or displacement measurement instruments and, more particularly, to an encoder configuration with signal processing which is resistant to errors that may be associated with a contaminated or defective portion of a scale.

Description of the Related Art

Optical position encoders determine the displacement of a readhead relative to a scale that includes a pattern that is detected by the readhead. Typically, position encoders employ a scale that includes at least one scale track that has a periodic pattern, and the signals arising from that scale track are periodic as a function of displacement or position of the readhead along the scale track. Absolute type position encoders may use multiple scale tracks to provide a unique combination of signals at each position along an absolute scale.

Optical encoders may utilize incremental or absolute position scale structures. An incremental position scale structure allows the displacement of a readhead relative to a scale to be determined by accumulating incremental units of displacement, starting from an initial point along the scale. Such encoders are suitable for certain applications, particularly those where line power is available. In low power consumption applications (e.g., battery powered gauges and the like), it is more desirable to use absolute position scale structures. Absolute position scale structures provide a unique output signal, or combination of signals, at each position along a scale, and therefore allow various power conservation schemes. U.S. Pat. Nos. 3,882,482; 5,965,879; 5,279,044; 5,886,519; 5,237,391; 5,442,166; 4,964,727; 4,414,754; 4,109,389; 5,773,820; and 5,010,655 disclose various encoder configurations and/or signal processing techniques relevant to absolute position encoders, and are hereby incorporated herein by reference in their entirety.

Some encoder configurations realize certain advantages by utilizing an illumination source light diffraction grating in an illumination portion of the encoder configuration. U.S. Pat. Nos. 8,941,052; 9,018,578; 9,029,757; and 9,080,899, each of which is hereby incorporated herein by reference in its entirety, disclose such encoder configurations. Some of the configurations disclosed in these patents may also be characterized as utilizing super resolution moiré imaging.

In various applications, scale manufacturing defects or contaminants such as dust or oils on a scale track may disturb the pattern detected by the readhead, creating errors in the resulting position or displacement measurements. In general, the size of errors due to a defect or contamination may depend on factors such as the size of the defect or contamination, the wavelength of the periodic pattern on the scale, the size of the readhead detector area, the relationship between these sizes, and the like. A variety of methods are known for responding to abnormal signals in an encoder. Almost all such methods are based on disabling the encoder signals, or providing an "error signal" to warn the user, or adjusting a light source intensity to boost low signals, or the like. However, such methods do not provide a means of continuing accurate measurement operations despite the abnormal signals that arise from certain types of scale defects or contamination. Therefore, these methods have limited utility. One known method that does mitigate the effects of scale contaminants or defects on measurement accuracy is disclosed in Japanese Patent Application JP2003-065803 (the '803 Application). The '803 Application teaches a method wherein two or more photo detectors output periodic signals having the same phase, which are each input to respective signal stability judging means. The signal stability judging means only outputs signals that are judged to be "normal," and "normal" signals are combined as the basis for position measurement. Signals that are "abnormal" are excluded from position measurement calculations. However, the methods of judging "normal" and "abnormal" signals disclosed in the '803 Application have certain disadvantages that limit the utility of the teachings of the '803 Application.

U.S. Pat. No. 8,493,572 (the '572 patent) discloses a contamination and defect resistant optical encoder configuration which provides a means to select signals from photodetector elements which are not subject to contamination. However, the '572 patent relies on complex signal processing that may be less desirable in some applications.

Improved methods for providing accurate measurement operations that avoid or mitigate abnormal signals that arise from certain types of scale defects or contamination without the need for complex signal processing would be desirable.

BRIEF SUMMARY

A contamination and defect resistant optical encoder configuration for providing displacement signals is disclosed. The contamination and defect resistant optical encoder configuration comprises a scale, an illumination source, and a photodetector configuration. The scale extends along a measuring axis direction, and comprises a scale grating comprising scale grating bars arranged in a scale plane that is nominally parallel to the measuring axis direction, wherein the scale grating bars are narrow along the measuring axis direction and elongated along a scale grating bar direction transverse to the measuring axis direction, and are arranged periodically at a scale pitch $P_{SF}$ along the measuring axis direction. The illumination source comprises a light source that outputs light, and a structured illumination generating portion configured to input the light and output structured illumination along a source light path SOLP to an illumination region at the scale plane where the structured illumination comprises an illumination fringe pattern comprising fringes that are narrow along the measuring axis direction and elongated along an illumination fringe direction oriented transverse to the measuring axis direction. The photodetector configuration comprises a set of N spatial phase detectors arranged periodically at a detector pitch PD along a detected fringe motion direction transverse to the measuring axis direction, wherein each spatial phase detector is configured to provide a respective spatial phase detector signal and at least a majority of the respective spatial phase detectors extend over a relatively longer dimension along the measuring axis direction and are relatively narrow along the detected fringe motion direction transverse to the measuring axis direction, and the set of N spatial phase detectors are arranged in a spatial phase sequence along the detected fringe motion direction. The scale grating is configured to input the illumination fringe pattern at the illumination region and output scale light along a scale light path SCLP that forms a fringe pattern at the photodetector configuration, the fringe pattern comprising periodic high and low intensity bands that extend over a relatively longer dimension along the measuring axis direction and are relatively narrow and periodic with a detected fringe period PDF along the detected fringe motion direction transverse to the measuring axis direction. The scale grating bar direction is oriented at a nonzero yaw angle $\psi_{SC}$ relative to a readhead plane RHP defined by the source light path SOLP and the scale light path SCLP. The detected fringe period PDF and the detected fringe motion direction transverse to the measuring axis direction depend at least partially on the nonzero yaw angle $\psi_{SC}$. The high and low intensity bands move along the detected fringe motion direction transverse to the measuring axis direction as the scale grating displaces along the measuring axis direction. A normal of the readhead plane RHP is oriented with a non-zero pitch angle $\phi$ relative to the measuring axis direction. The photodetector configuration is configured to detect a displacement of the high and low intensity bands along the detected fringe motion direction transverse to the measuring axis direction and provide respective spatial phase displacement signals that are indicative of the scale displacement.

BRIEF DESCRIPTION OF THE DRAWINGS

The foregoing aspects and many of the attendant advantages will become more readily appreciated as the same become better understood by reference to the following detailed description, when taken in conjunction with the accompanying drawings.

FIG. 4A is a schematic diagram of a portion of a photodetector configuration of a contamination and defect resistant optical encoder configuration.

FIG. 4B is a schematic diagram of a portion of a photodetector configuration of a contamination and defect resistant optical encoder configuration.

FIG. 11A is a schematic diagram of a first illumination source diffraction grating.

FIG. 11B is a schematic diagram of a second illumination source diffraction grating.

DETAILED DESCRIPTION

Figure 1:
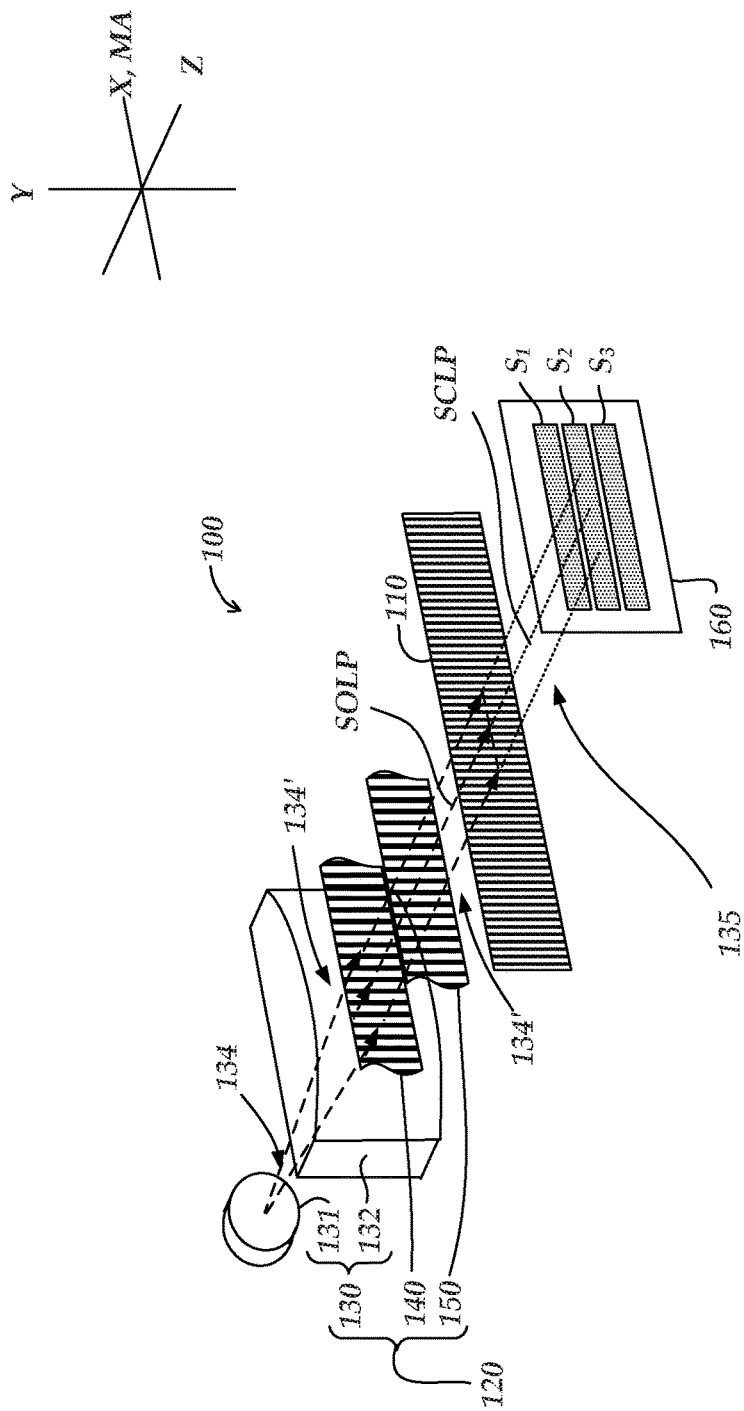
FIG. 1 is a partially schematic exploded diagram of a contamination and defect resistant optical encoder configuration for providing displacement signals.

FIG. 1 is a partially schematic exploded diagram of a contamination and defect resistant optical encoder configuration 100 for providing displacement signals. The encoder configuration 100 comprises a scale grating 110, an illumination portion 120, and a photodetector configuration 160.

FIG. 1 shows orthogonal X, Y, and Z directions, according to a convention used herein. The X and Y directions are parallel to the plane of the scale grating 110, with the X direction parallel to a measuring axis direction MA (e.g., perpendicular to elongated pattern elements of the scale grating 110). The Z direction is normal to the plane of the scale grating 110.

In the implementation shown in FIG. 1, the scale grating 110 is a transmissive grating. The scale grating 110 extends along a measuring axis direction MA, and comprises a periodic pattern comprising bars that are narrow along the measuring axis direction MA and elongated along a perpendicular to the measuring axis direction MA (i.e., the Y direction), and that are arranged periodically along the measuring axis direction MA.

The illumination portion 120 comprises an illumination source 130, a first illumination grating 140, and a second illumination grating 150. The illumination source 130 comprises a light source 131, and a collimating lens 132. The light source 131 is configured to output source light 134 to the collimating lens 132. The collimating lens 132 is configured to receive the source light 134 and output collimated source light 134' to the first illumination grating 140. The first illumination grating 140 receives the source light 134' and diffracts the source light 134' toward the second illumination grating 150. The second illumination grating 150 receives the source light 134' and further diffracts the source light 134' toward the scale grating 110 along a source light path SOLP. The scale grating 110 inputs the source light 134' along the source light path SOLP and outputs scale light comprising a periodic scale light pattern 135 along a scale light path SCLP to the photodetector configuration 160. The photodetector configuration 160 receives the periodic scale light pattern 135 from the scale grating 110 along the scale light path SCLP. The periodic scale light pattern 135 displaces past the photodetector configuration 160 corresponding to a relative displacement between the scale grating 110 and the photodetector configuration 160 along the measuring axis direction MA. An example of a photodetector configuration similar to the photodetector configuration 160 is shown in detail FIG. 3. The photodetector configuration 160 comprises a set of N spatial phase detectors arranged in a spatial phase sequence along a direction transverse to the measuring axis direction MA (i.e., the Y direction), where N is an integer that is at least 6 and the spatial phase sequence comprises two outer spatial phase detectors at a start and end of the sequence along the direction transverse to the measuring axis and an interior group of spatial phase detectors located between the two outer spatial phase detectors. In the implementation shown in FIG. 1, the set of N spatial phase photodetectors comprises 3 subsets of spatial phase detectors $S_1$, $S_2$, and $S_3$ that have the same subset spatial phase sequence.

At least a majority of the respective spatial phase detectors are relatively elongated along the measuring axis direction MA and relatively narrow along the direction perpendicular to the measuring axis direction MA (i.e., the Y direction), and comprise scale light receptor areas that are spatially periodic along the measuring axis direction MA and positioned corresponding to a respective spatial phase of that spatial phase detector relative to the periodic scale light pattern, and are configured to provide a respective spatial phase detector signal. Each spatial phase detector in the interior group is preceded and followed in the spatial phase sequence by spatial phase detectors that have respective spatial phases that are different from that spatial phase detector and different from each other.

In various applications, the photodetector configuration 160 and the illumination portion 120 may be mounted in a fixed relationship relative to one another, e.g., in a readhead or gauge housing (not shown), and are guided along the measuring axis direction MA relative to the scale grating 110 by a bearing system, according to known techniques. The scale grating 110 may be attached to a moving stage, or a gauge spindle, or the like, in various applications.

It should be appreciated that the contamination and defect resistant optical encoder configuration 100 is only one example of a contamination and defect resistant optical encoder configuration according to the principles disclosed herein. In alternative implementations, various optical components may be utilized such as a telecentric imaging system, limiting apertures, and the like. In alternative implementations, an illumination portion may comprise only a single illumination grating.

Figure 2:
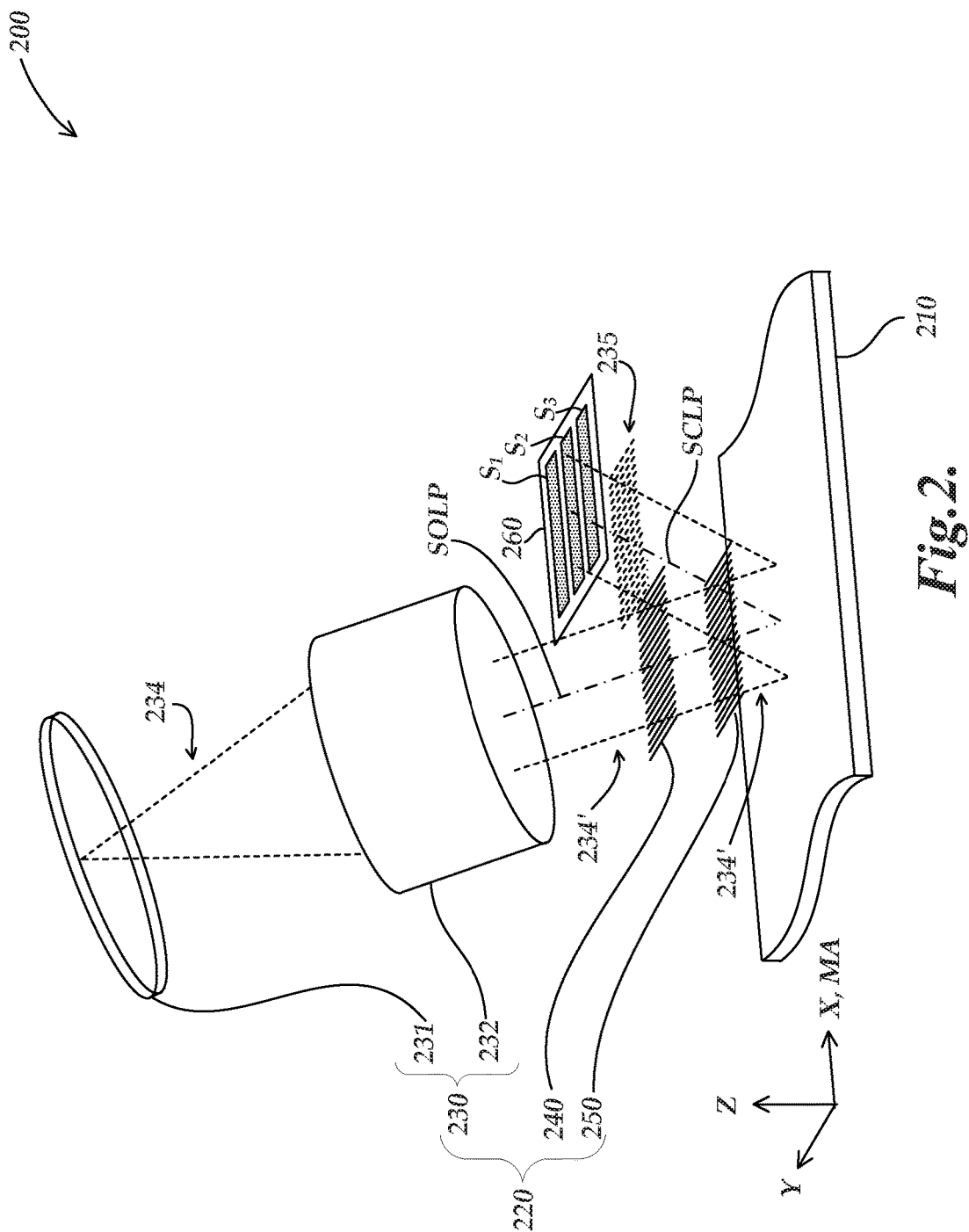
FIG. 2 is a partially schematic diagram of a contamination and defect resistant optical encoder configuration for providing displacement signals.

FIG. 2 is a partially schematic diagram of a contamination and defect resistant optical encoder configuration 200 for providing displacement signals. The optical encoder configuration 200 is similar to the encoder configuration 100. Similar references numbers 2XX in FIGS. 2 and 1XX in FIG. 1 may refer to similar elements unless otherwise indicated by context or description. The encoder configuration 200 shown in FIG. 2 is a reflective configuration. Scale 210 is a reflective scale grating.

Figure 3:
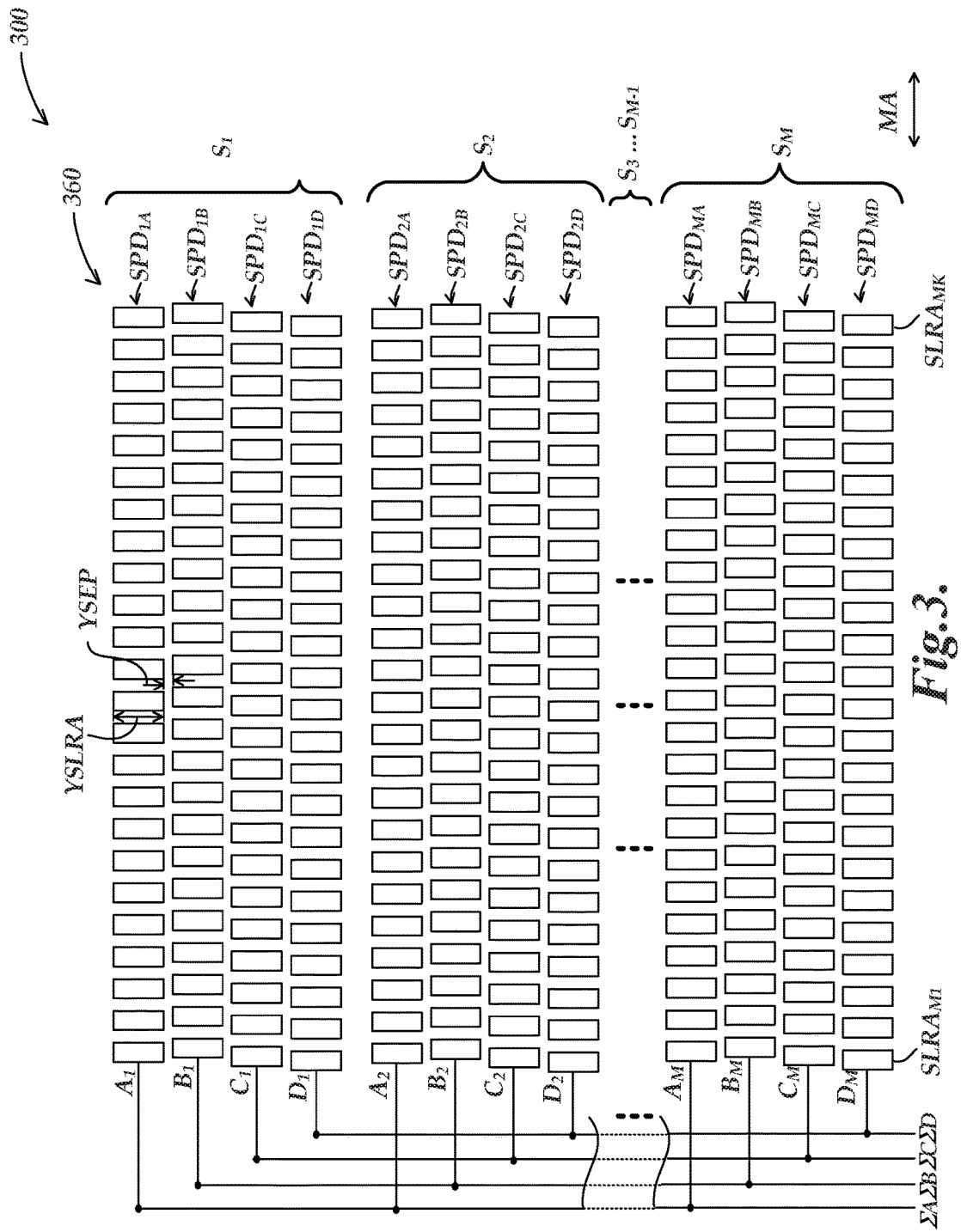
FIG. 3 is a partially schematic diagram of a photodetector configuration of a contamination and defect resistant optical encoder configuration.

FIG. 3 is a partially schematic diagram of a photodetector configuration 360 of a contamination and defect resistant optical encoder configuration 300. The contamination and defect resistant optical encoder configuration 300 may be similar to the contamination and defect resistant optical encoder configuration 100 or the contamination and defect resistant optical encoder configuration 200. The photodetector configuration 360 comprises a set of N spatial phase detectors arranged in a spatial phase sequence along a direction transverse to the measuring axis direction MA, where N is an integer that is at least 6 and the spatial phase sequence comprises two outer spatial phase detectors at a start and end of the sequence along the direction transverse to the measuring axis and an interior group of spatial phase detectors located between the two outer spatial phase detectors. At least a majority of the respective spatial phase detectors are relatively elongated along the measuring axis direction MA and relatively narrow along the direction perpendicular to the measuring axis direction MA, and comprise scale light receptor areas that are spatially periodic along the measuring axis direction MA and positioned corresponding to a respective spatial phase of that spatial phase detector relative to the periodic scale light pattern, and are configured to provide a respective spatial phase detector signal. Each spatial phase detector in the interior group is preceded and followed in the spatial phase sequence by spatial phase detectors that have respective spatial phases that are different from that spatial phase detector and different from each other.

In some implementations, the set of N spatial phase photodetectors may comprise at least M subsets of spatial phase detectors, where M is an integer that is at least 2, and wherein each of the M subsets includes spatial phase detectors that provide each of the respective spatial phases included in the set of N spatial phase photodetectors. In some implementations, M may be at least 3. In some implementations, M may be at least 6. In some implementations, each of the M subsets of spatial phase detectors may comprise spatial phase detectors that provide the same respective spatial phases arranged in the same subset spatial phase sequence. FIG. 3 shows an implementation with M subsets of spatial phase detectors indicated as $S_1$ through $S_M$. The subset $S_1$ comprises spatial phase detectors $SPD_{1A}$, $SPD_{1B}$, $SPD_{1C}$, and $SPD_{1D}$. The subset $S_2$ comprises spatial phase detectors $SPD_{2A}$, $SPD_{2B}$, $SPD_2$, and $SPD_{2D}$. The subset $S_M$ comprises spatial phase detectors $SPD_{MA}$, $SPD_{MB}$, $SPD_{MC}$, and $SPD_{MD}$. Each of the spatial phase detectors in FIG. 3 is shown to have K scale light receptor areas. As an example of scale light receptor areas, the spatial phase detector $SPD_{MD}$ is labeled with scale light receptor areas $SLRA_{M1}$ and $SLRA_{MK}$. In some implementations, K may be an even value.

In the implementation shown in FIG. 3, the spatial phase sequence is indicated by spatial phase detectors including subscript indices A, B, C, and D (e.g., the spatial phase detectors $SPD_{1A}$, $SPD_{1B}$, $SPD_{1C}$, and $SPD_{1D}$). The spatial phase detectors with subscript indices A and D are the two outer spatial phase detectors at the start and end of each instance of the spatial phase sequence. The spatial phase detectors with subscript indices B and C are the interior groups.

The spatial phase detectors $SPD_{1A}$, $SPD_{1B}$, $SPD_{1C}$, and $SPD_{1D}$ output respective spatial phase detector signals $A_1$, $B_1$, $C_1$, and $D_1$. The spatial phase detectors $SPD_{2A}$, $SPD_{2B}$, $SPD_{2C}$ and $SPD_{2D}$ output respective spatial phase detector signals $A_2$, $B_2$, $C_2$, and $D_2$. The spatial phase detectors $SPD_{MA}$, $SPD_{MB}$, $SPD_{MC}$, and $SPD_{MD}$ output respective spatial phase detector signals $A_M$, $B_M$, $C_M$, and $D_M$.

A contamination and defect resistant optical encoder configured according to the principles disclosed herein provides a simple design which may be tolerant to contaminants (e.g., wirebonding contamination) which are as large as 100 micrometers and scale defects which are as large as 300 micrometers. Contaminants or defects on a scale will typically produce a common mode error component on adjacent spatial phase detectors which may be canceled out in signal processing (e.g., quadrature processing). Spatial phase detectors which are relatively elongated along the measuring axis direction MA and relatively narrow along the direction perpendicular to the measuring axis direction MA provide better resistance to contamination and defects. Signal levels may change more slowly by decreasing the frequency of the structure of the spatial phase detectors along the measuring axis direction MA. Furthermore, such an encoder does not require complex signal processing to provide tolerance to contamination and defects. Signals provided by the set of N spatial phase detectors may be processed according to standard techniques known to one skilled in the art.

In some implementations such as the implementation shown in FIG. 3, N is at least 8 and each subset of spatial phase detectors may comprise four spatial phase detectors having respective spatial phases separated by 90 degrees. In alternative implementations, each subset of spatial phase detectors may comprise three spatial phase detectors having respective spatial phases separated by 120 degrees.

In the implementation shown in FIG. 3, the photodetector configuration 360 includes connections configured to combine spatial phase detector signals corresponding to the same respective spatial phase and to output each such combination as a respective spatial phase position signal. The photodetector configuration 360 is configured to output four spatial phase position signals corresponding to spatial phases separated by 90 degrees. Spatial phase signals with the same letter designation (e.g., $A_1$, $A_2$, and $A_M$) are combined (e.g., summed) to provide spatial phase signals $\Sigma A$, $\Sigma B$, $\Sigma C$, and $\Sigma D$. In alternative implementations, a photodetector configuration may be configured to output three spatial phase position signals corresponding to spatial phases separated by 120 degrees. In either case, spatial phase position signals may be further utilized to determine displacement signals, e.g., through quadrature or three-phase signal processing.

In some implementations, each of the respective spatial phase detectors may be relatively elongated along the measuring axis direction MA and relatively narrow along the direction perpendicular to the measuring axis direction MA, and may comprise scale light receptor areas that are spatially periodic along the measuring axis direction MA and positioned corresponding to a respective spatial phase of that spatial phase detector relative to the periodic scale light pattern, and may be configured to provide a respective spatial phase detector signal.

In some implementations, a dimension YSLRA of the scale light receptor areas of each of the N spatial phase detectors along the Y direction may be at most 250 micrometers. In some implementations, YSLRA may be at least 5 micrometers.

In some implementations, a separation distance YSEP between the scale light receptor areas of each adjacent pair of the N spatial phase detectors along the Y direction may be at most 25 micrometers.

In some implementations, a dimension YSLRA of the scale light receptor areas of each of the N spatial phase detectors may be the same along the Y direction. In some implementations, a separation distance YSEP between the scale light receptor areas of each adjacent pair of the N spatial phase detectors may be the same along the Y direction.

It should be appreciated that while a large value of N provides greater robustness to contamination, there is a tradeoff in that a large value of N may provide smaller signal levels within each individual spatial phase detector.

FIG. 4A is a schematic diagram of a portion of a photodetector configuration 460A of a contamination and defect resistant optical encoder configuration 400A. For simplicity, FIG. 4A only shows one subset of spatial phase detectors $S_1$ with two spatial phase detectors $SPD_{1A}$ and $SPD_{1B}$. It should be appreciated that the photodetector configuration 460A comprises at least six spatial phase detectors according to the principles disclosed herein, but only two are shown for simplicity. In the implementation shown in FIG. 4A, each of the N spatial phase detectors (e.g., spatial phase detectors $SPD_{1A}$ and $SPD_{1B}$) comprises a photodetector (e.g., photodetectors $PD_{1A}$ and $PD_{1B}$ indicated by dashed lines) covered by a spatial phase mask (e.g., phase masks $PM_{1A}$ and $PM_{1B}$) that blocks the photodetector from receiving the periodic scale light pattern except through openings included in the spatial phase mask. In this case, the scale light receptor areas comprise areas of the photodetectors (e.g., the photodetectors $PD_{1A}$ and $PD_{1B}$) that are exposed through the openings in the respective spatial phase masks (e.g., the spatial phase masks $PM_{1A}$ and $PM_{1B}$). In the implementation shown in FIG. 4A, the scale light receptor areas (i.e., the openings) of the phase mask $PM_{1B}$ are offset relative to the scale light receptor areas of the phase mask $PM_{1A}$ along the measuring axis direction MA by 90 degrees. It should be appreciated that the while the spatial phase masks $PM_{1A}$ and $PM_{1B}$ are schematically illustrated as separate portions in FIG. 4A, in some implementations, they may be conveniently constructed with the same material in the same process to eliminate any potential positioning errors.

Figure 5:
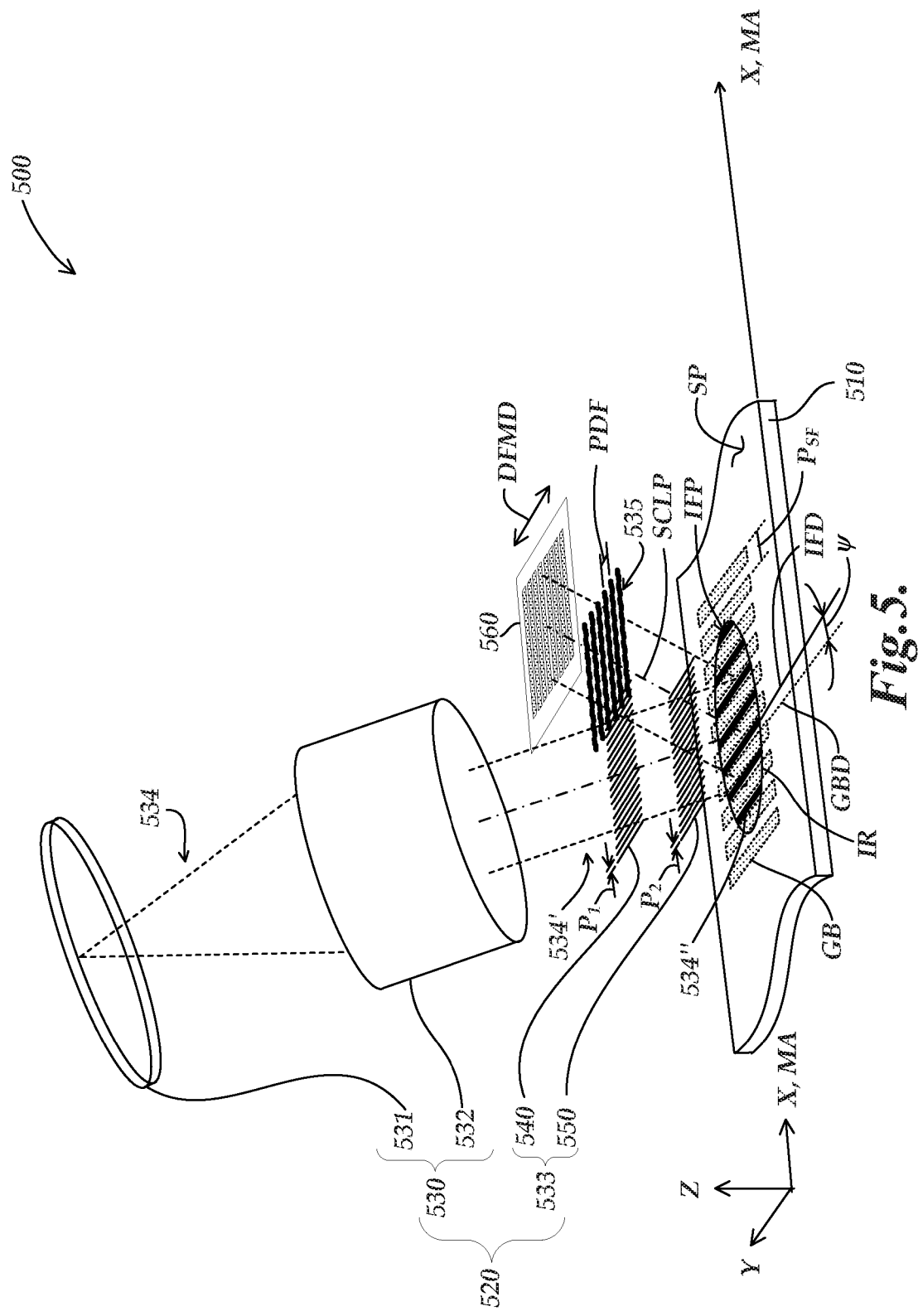
FIG. 5 is a partially schematic diagram of an additional implementation of a contamination and defect resistant optical encoder configuration for providing displacement signals, wherein a detector fringe pattern moves transverse to the measuring axis direction during optical encoder displacement.

FIG. 4B is a schematic diagram of a portion of a photodetector configuration 460B of a contamination and defect resistant optical encoder configuration 400B. For simplicity, FIG. 4B only shows one subset of spatial phase detectors $S_1'$ with two spatial phase detectors $SPD_{1A}'$ and $SPD_{1B}'$. It should be appreciated that the photodetector configuration 460B comprises at least six spatial phase detectors according to the principles disclosed herein, but only two are shown for simplicity. In the implementation shown in FIG. 4B, each of the N spatial phase detectors (e.g., spatial phase detectors $SPD_{1A}'$ and $SPD_{1B}'$) comprises a periodic array of electrically interconnected photodetector areas that receive the periodic scale light pattern. In this case, the scale light receptor areas comprise the photodetector areas of the periodic array of photodetectors. In the implementation shown in FIG. 4B, the photodetector areas of the spatial phase detector $SPD_{1B}'$ are offset relative to the photodetector areas of the spatial phase detector $SPD_{1A}'$ along the measuring axis direction MA by 90 degrees. FIG. 5 is a partially schematic diagram of an additional implementation of a contamination and defect resistant optical encoder configuration 500 for providing displacement signals. In the encoder configuration 500, the periodic scale light pattern 535 that is detected comprises a detector fringe pattern 535, which includes bands that are oriented to extend over a relatively longer dimension along the measuring axis direction MA, and that move transverse to the measuring axis direction along a detected fringe motion direction DFMD during optical encoder displacement.

The encoder configuration 500 comprises a scale 510, an illumination source 520, and a photodetector configuration 560. The scale 510 extends along a measuring axis direction MA, and comprises a scale grating comprising grating bars GB arranged in a scale plane SP that is nominally parallel to the measuring axis direction MA, wherein the grating bars GB are narrow along the measuring axis direction MA and elongated along a grating bar direction GBD transverse to the measuring axis direction MA, and are arranged periodically at a scale pitch $P_{SF}$ along the measuring axis direction MA. The illumination source 520 comprises a light source 530 that outputs light 534', and a structured illumination generating portion 533 configured to input the light 534' and output structured illumination 534" to an illumination region IR at the scale plane SP, where the structured illumination 534" comprises an illumination fringe pattern IFP comprising fringes that are narrow along the measuring axis direction MA and elongated along an illumination fringe direction IFD oriented transverse to the measuring axis direction MA at a nonzero illumination fringe yaw angle ψ relative to the grating bar direction GBD. The light source 530 comprises a point source 531 and a collimating lens 532. The point source 531 outputs light 534 to the collimating lens which then collimates the light 534 to provide the light 534'. The nonzero illumination fringe yaw angle ψ may be achieved in various implementations by rotating one or more elements of the structured illumination generating portion 533 (e.g., one of the grating elements 540 and/or 550) about the Z axis, to a desired angle relative to the Y axis. In some embodiments, the nonzero illumination fringe yaw angle ψ may also be achieved or augmented by rotating the grating bar direction GBD about the Z axis, to a desired angle relative to the Y axis.

Figure 8:
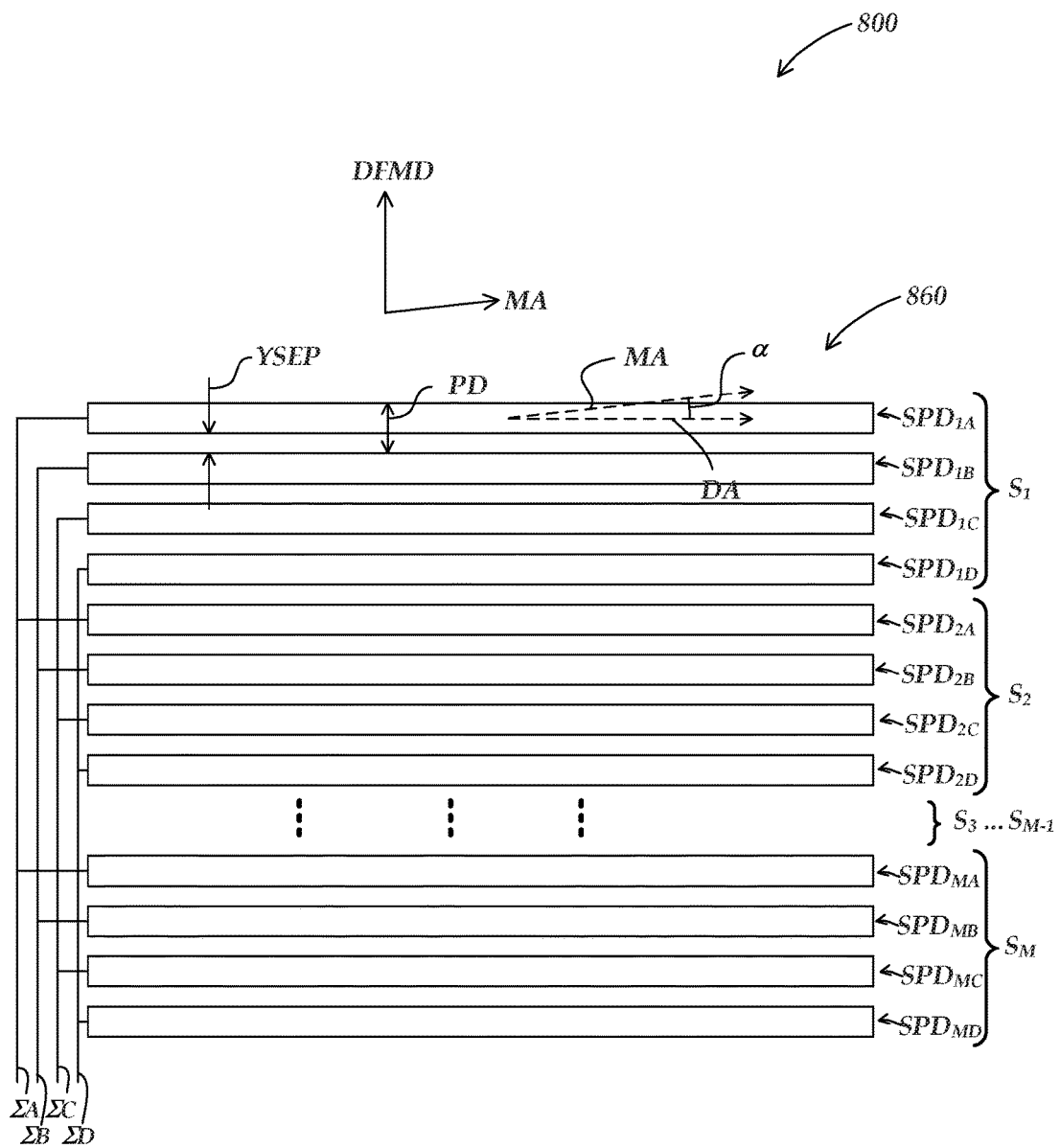
FIG. 8 is a schematic diagram of one exemplary photodetector configuration usable in a contamination and defect resistant optical encoder similar to the optical encoder represented in FIG. 5 and FIG. 6, wherein the photodetector configuration includes spatial phase detectors that are elongated approximately along the measuring axis direction and arranged periodically transverse to the measuring axis direction.
Figure 9A:
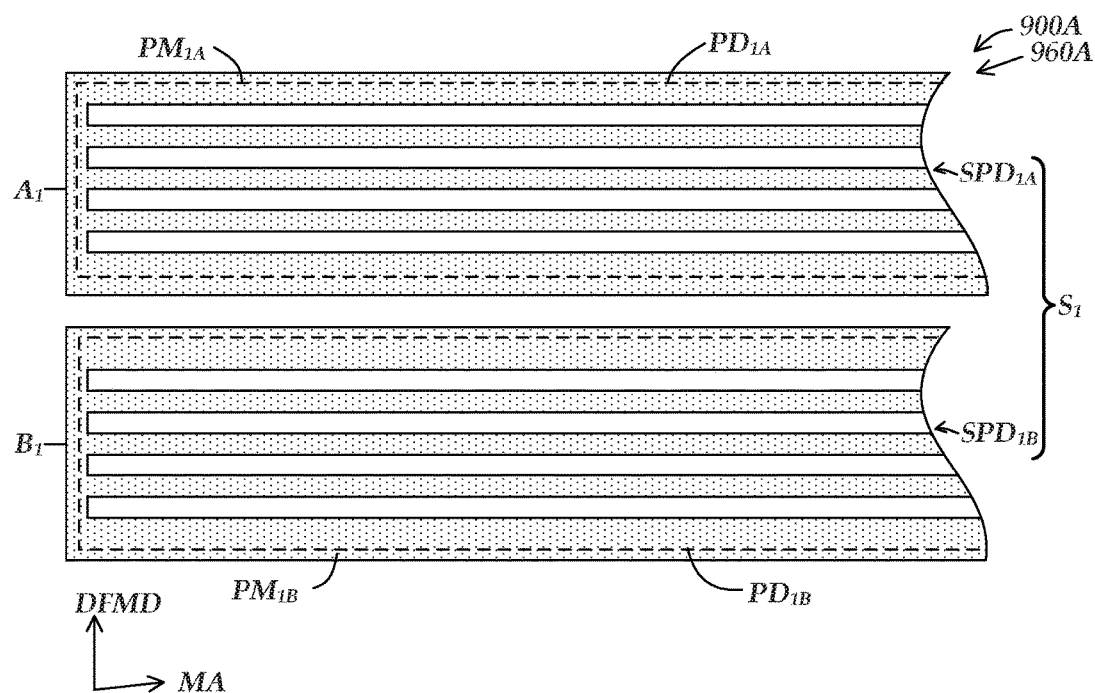
FIG. 9A is a detailed schematic diagram of a section of another exemplary photodetector configuration of a contamination and defect resistant optical encoder which is similar to the photodetector configuration shown in FIG. 8.
Figure 9B:
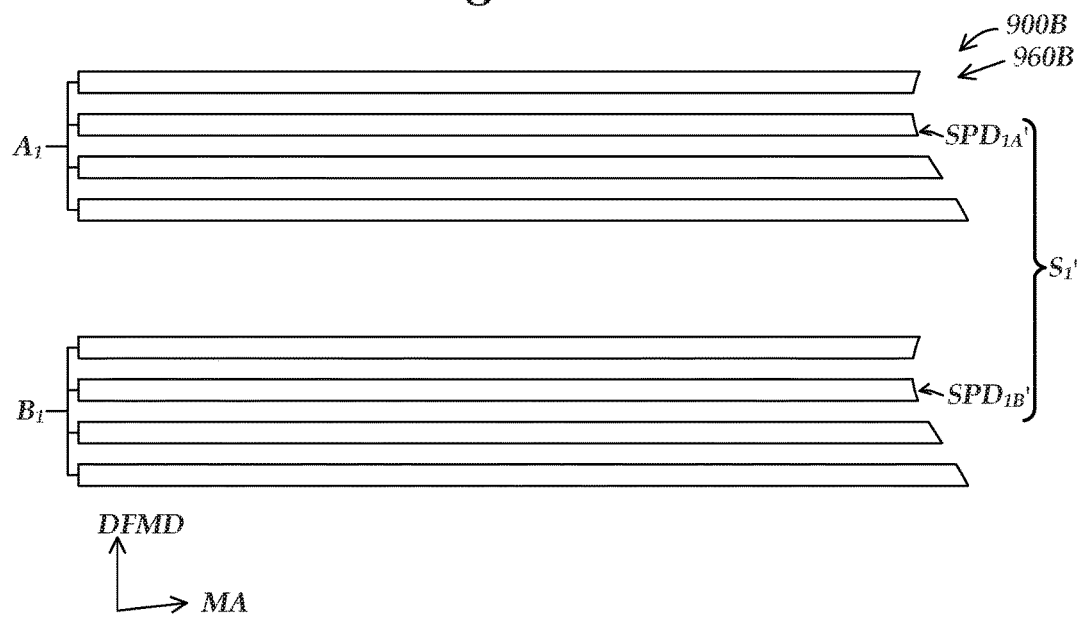
FIG. 9B is a detailed schematic diagram of a section of another exemplary photodetector configuration of a contamination and defect resistant optical encoder which is similar to the photodetector configuration shown in FIG. 8.

The photodetector configuration 560 comprises a set of N spatial phase detectors arranged periodically at a detector pitch PD (shown in FIG. 6A and FIG. 6B) along a detected fringe motion direction DFMD transverse to the measuring axis direction MA, wherein each spatial phase detector is configured to provide a respective spatial phase detector signal and at least a majority of the respective spatial phase detectors extend over a relatively longer dimension along the measuring axis direction MA and are relatively narrow along the detected fringe motion direction DFMD transverse to the measuring axis, and the set of N spatial phase detectors are arranged in a spatial phase sequence along the detected fringe motion direction DFMD, as described in greater detail below with reference to FIGS. 8, 9A and 9B.

The scale 510 is configured to input the illumination fringe pattern at the illumination region IR and output scale light components along a scale light path SCLP to form the detector fringe pattern 535 at the photodetector configuration 560. The detector fringe pattern 535 comprises periodic high and low intensity bands that extend over a relatively longer dimension along the measuring axis direction MA and are relatively narrow and periodic with a detected fringe period PDF along the detected fringe motion direction DFMD transverse to the measuring axis direction MA, as described in greater detail below with reference to FIG. 6. As a way of describing their orientation, the bands extend over a relatively longer dimension along the measuring axis direction MA, but in various implementations this does not mean they are required to be aligned along the measuring axis direction. In various exemplary implementations, the bands may be aligned at a moderate or small angle relative to the measuring axis direction, as explained below with reference to FIG. 6.

The detected fringe period PDF and the detected fringe motion direction DFMD transverse to the measuring axis direction MA depend at least partially on the nonzero illumination fringe yaw angle ψ, as outlined below with reference to FIG. 7. The high and low intensity bands move along the detected fringe motion direction DFMD transverse to the measuring axis direction MA as the scale 510 displaces along the measuring axis direction MA. The photodetector configuration 560 is configured to detect a displacement of the high and low intensity bands along the detected fringe motion direction DFMD transverse to the measuring axis direction MA and provide respective spatial phase displacement signals that are indicative of the scale displacement.

In the implementation shown in FIG. 5, the structured illumination generating portion 533 comprises a first illumination source light diffraction grating 540 and a second illumination source light diffraction grating 550. In some implementations, the first illumination source light diffraction grating 540 and the second illumination source light diffraction grating 550 may be phase gratings. Phase gratings provide better power efficiency by reducing light loss.

A contamination and defect resistant optical encoder configured according to the principles described with respect to FIG. 5 through FIG. 9B will provide a simple design which may be tolerant to contaminants (e.g., wirebonding contamination) which are as large as 100 micrometers and scale defects which are as large as 300 micrometers. Contaminants or defects on a scale that are similar in size or larger than the detection fringe period will typically produce a common mode error component on adjacent spatial phase detectors which may be canceled out in signal processing (e.g., quadrature processing). That is, the effect of contamination moving along the measuring axis direction will tend to be shared across adjacent spatial phase detectors, and will move along the measuring axis direction on those adjacent spatial phase detectors as the scale or readhead configuration displace along the measuring axis direction. Because the contamination effect is a common mode effect across adjacent spatial phase detectors, and because the spatial phase detectors are relatively elongated over a dimension along the measuring axis direction that may substantially exceed the size of the contamination effect, the effect of the contamination on the displacement signal accuracy may be substantially mitigated. Another advantage is that in the case of any residual non-common mode error, as the photodetector configuration 560 displaces relative to the scale 510, portions of the detector fringe pattern 535 corresponding to a defect will move very slowly from one spatial phase detector to another, which allows for more effective compensation of spatial phase displacement signals. Such an encoder does not require complex signal processing to provide tolerance to contamination and defects. Spatial phase displacement signals provided by the set of N spatial phase detectors may be processed according to standard techniques known to one skilled in the art.

Figure 6A:
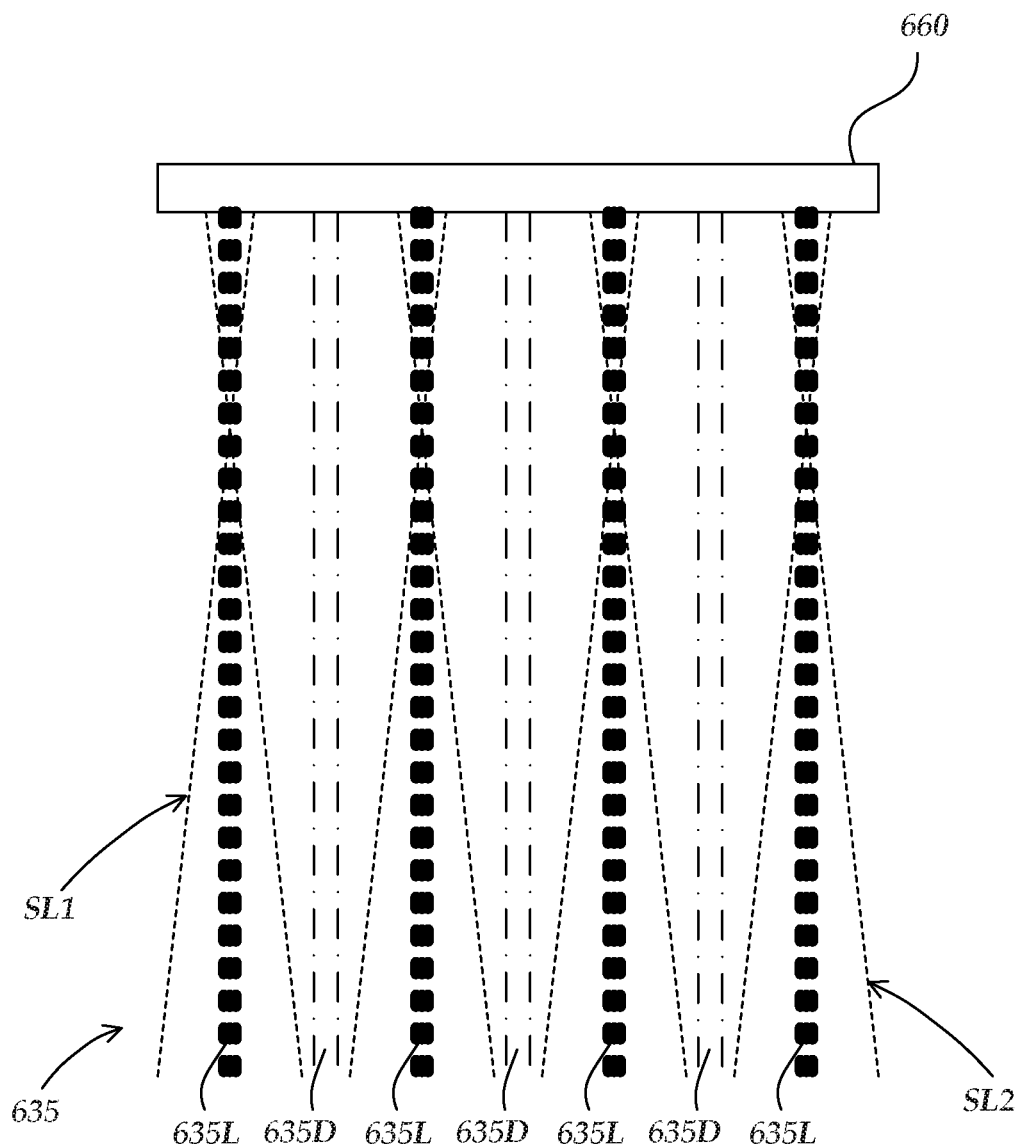
FIG. 6A is a schematic diagram representing a first view of scale light components that form a detector fringe pattern proximate to a photodetector configuration including spatial phase detectors that are elongated approximately along the measuring axis direction and arranged periodically transverse to the measuring axis direction.

FIG. 6A is a diagram schematically representing a first view of scale light components SL1 and SL2 that form a detector fringe pattern 635 similar or identical to the detector fringe pattern 535 shown proximate to a photodetector configuration 660 which is similar to the photodetector configuration 560 in FIG. 5. The detector fringe pattern 635 may be provided by an optical encoder similar to the optical encoder configuration 500 outlined with reference to FIG. 5. FIG. 6A shows a cross section of the scale light which forms the detector fringe pattern 635 in a plane defined by a measuring axis direction MA and a scale light path SCLP as previously shown with respect to FIG. 5. As shown in FIG. 6A, the scale light components comprise a first scale light component SL1 and a second scale light component SL2 (indicated by dashed lines representing high intensity bands) which each comprise parallel rays, where the parallel rays of the first scale light component SL1 are along a direction with an opposite angular orientation with respect to the scale light path SCLP. The first scale light component SL1 and the second scale light component SL2 overlap to form the detector fringe pattern 635, according to known principles. The first scale light component SL1 and second scale light component SL2 may be formed from different diffractive orders from a structured illumination generating portion. The detector fringe pattern 635 comprises dark or low intensity interference bands 635D indicated by bold lines, and light or high intensity interference bands 635L indicated by dashed outlines.

Figure 6B:
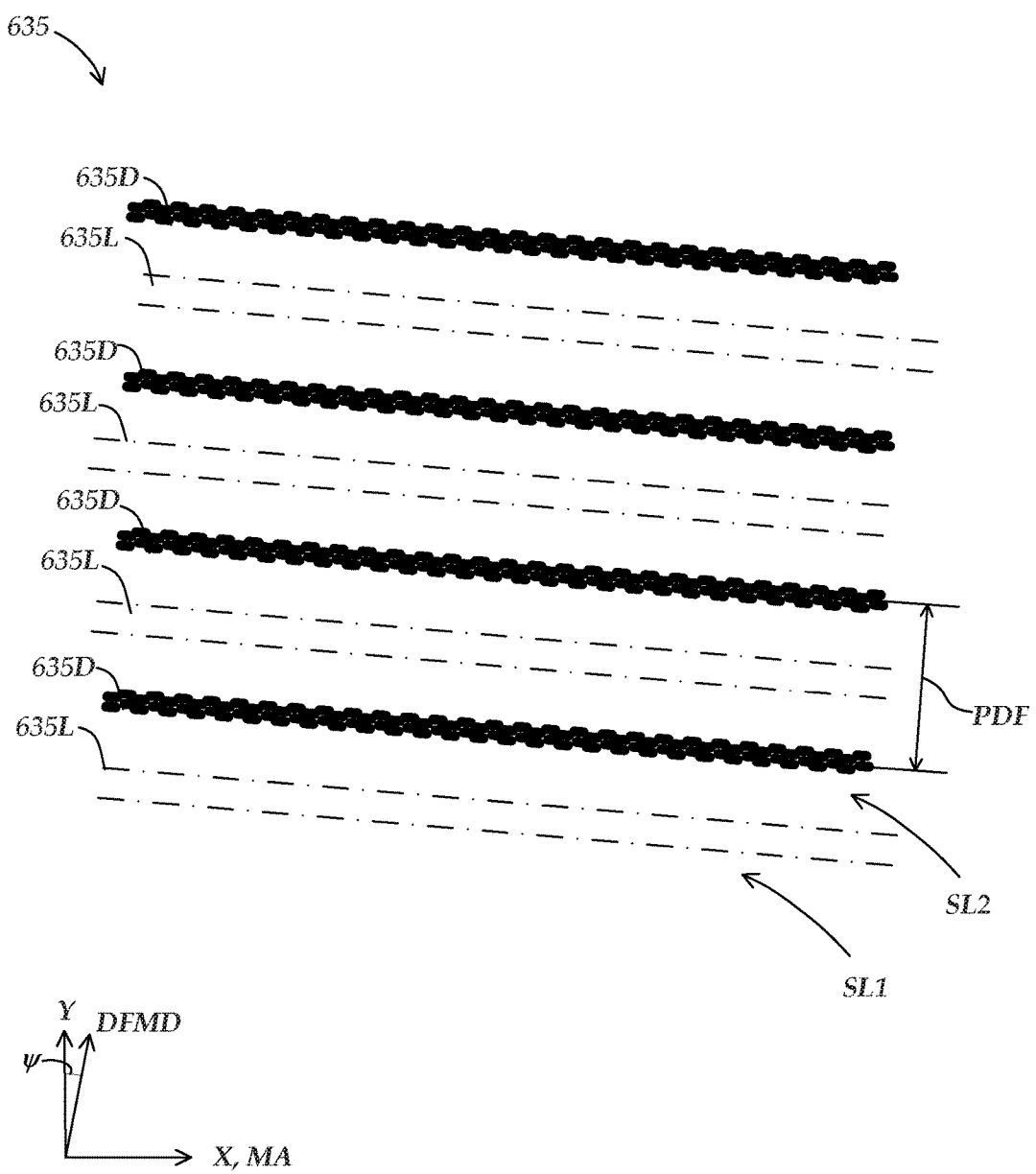
FIG. 6B is a schematic diagram representing a second view of scale light components that form a detector fringe pattern proximate to a photodetector configuration including spatial phase detectors that are elongated approximately along the measuring axis direction and arranged periodically transverse to the measuring axis direction.

FIG. 6B is a diagram schematically representing a second view of scale light components SL1 and SL2 that form the fringe pattern 635. FIG. 6A shows a cross section of the detector fringe pattern 635 in a plane defined by a measuring axis direction MA and a Y direction as previously shown with respect to FIG. 5, which is proximate to the photodetector configuration 660. The detector fringe pattern 635 comprises dark or low intensity interference bands 635D indicated by bold lines and light or high intensity interference bands 635L indicated by dashed outlines, which are periodic with a detected fringe period PDF along the detected fringe motion direction DFMD, as shown in FIG. 6B. The detected fringe motion direction is generally transverse to the direction of the interference bands 635D and 635L, with a slight rotation equal to the nonzero illumination fringe yaw angle $\psi$ relative to the Y direction.

Figure 7:
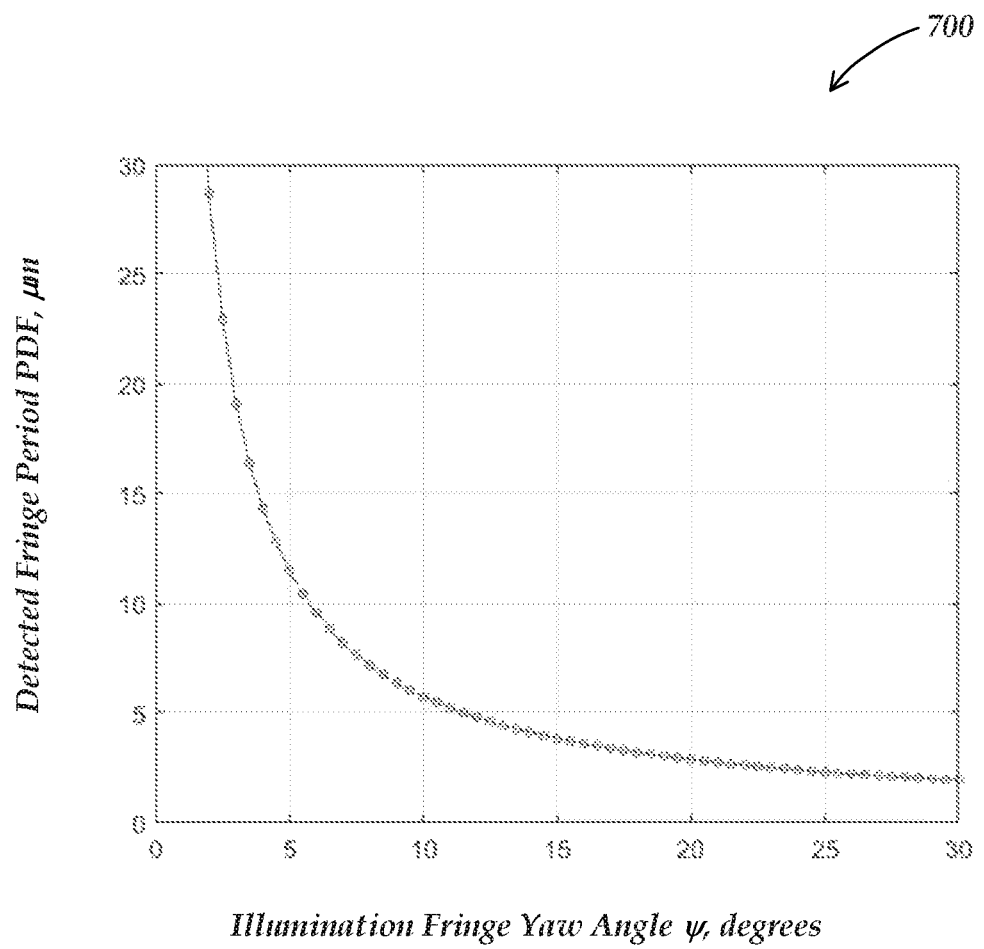
FIG. 7 is a graph of properties of a contamination and defect resistant optical encoder similar to the optical encoder represented in FIG. 5 and FIG. 6, including a detected fringe period versus an illumination fringe yaw angle.

FIG. 7 is a graph 700 of properties of a contamination and defect resistant optical encoder similar to the optical encoder configuration 500 represented in FIG. 5 and FIG. 6, including a detected fringe period PDF versus an illumination fringe yaw angle $\psi$. The graph 700 shows data for a contamination and defect resistant optical encoder which comprises a structured illumination generating portion with a first illumination source light diffraction grating having a grating pitch $P_1$, a second illumination source light diffraction grating having a pitch $P_2$, and a scale having a scale pitch $P_{SF}$, which satisfies the expression:

$$\frac{1}{P_2} - \frac{1}{P_1} = \frac{1}{P_{SF}} \quad (1)$$

The detected fringe period PDF then relates to the illumination fringe yaw angle $\psi$ by the expression:

$$PDF = \frac{P_{SF}}{4 \sin(\psi/2)} \quad (2)$$

It is generally desirable for a contamination and defect resistant optical encoder to be configured such that the detected fringe period PDF is large (e.g., greater than 7 micrometers, or in some implementations, greater than 40 micrometers), which requires a small value of the illumination fringe yaw angle $\psi$ (e.g., less than 7 degrees). A larger detected fringe period PDF provides better tolerance to measurement errors from misalignment between a scale, a photodetector configuration, and an illumination source. Errors arising from pitch and roll of a scale relative to an illumination source and/or a photodetector configuration are inversely proportional to the detected fringe period PDF. Therefore, a larger detected fringe period PDF will provide better robustness to measurement errors caused by scale waviness.

FIG. 8 is a schematic diagram 800 of one exemplary photodetector configuration 860 usable in a contamination and defect resistant optical encoder which is similar to the optical encoder configuration 500 represented in FIG. 5 and FIG. 6, wherein the photodetector configuration includes spatial phase detectors that are elongated approximately or roughly along the measuring axis direction and arranged periodically transverse to the measuring axis direction. Similar references numbers 8XX in FIGS. 8 and 5XX in FIG. 5 may refer to similar elements unless otherwise indicated by context or description.

The photodetector configuration 860 comprises a set of N spatial phase detectors arranged in a spatial phase sequence along the detected fringe motion direction DFMD, where N is an integer that is at least 6 and the spatial phase sequence comprises two outer spatial phase detectors at a start and end of the sequence along the direction transverse to the measuring axis direction MA and an interior group of spatial phase detectors located between the two outer spatial phase detectors. Each spatial phase detector in the interior group is preceded and followed in the spatial phase sequence by spatial phase detectors that have respective spatial phases that are different from that spatial phase detector and different from each other. Each spatial phase detector comprises scale light receptor areas that are spatially periodic along the detected fringe motion direction DFMD and positioned corresponding to a respective spatial phase of that spatial phase detector relative to the periodic scale light pattern. Each spatial phase detector in the interior group is preceded and followed in the spatial phase sequence by spatial phase detectors that have respective spatial phases that are different from that spatial phase detector and different from each other.

In some implementations, the set of N spatial phase photodetectors may comprise at least M subsets of spatial phase detectors, where M is an integer that is at least 2, and wherein each of the M subsets includes spatial phase detectors that provide each of the respective spatial phases included in the set of N spatial phase photodetectors. In some implementations, M may be at least 4. In some implementations, M may be at least 6. In some implementations, each of the M subsets of spatial phase detectors may comprise spatial phase detectors that provide the same respective spatial phases arranged in the same subset spatial phase sequence. FIG. 8 shows an implementation with M subsets of spatial phase detectors indicated as $S_1$ through $S_M$. The subset $S_1$ comprises spatial phase detectors $SPD_{1A}$, $SPD_{1B}$, $SPD_{1C}$, and $SPD_{1D}$. The subset $S_2$ comprises spatial phase detectors $SPD_{2A}$, $SPD_{2B}$, $SPD_2$, and $SPD_{2D}$. The subset $S_M$ comprises spatial phase detectors $SPD_{MA}$, $SPD_{MB}$, $SPD_{MC}$, and $SPD_{MD}$.

In the implementation shown in FIG. 8, the spatial phase sequence is indicated by spatial phase detectors including subscript indices A, B, C, and D (e.g., the spatial phase detectors $SPD_{1A}$, $SPD_{1B}$, $SPD_{1C}$, and $SPD_{1D}$). The spatial phase detectors with subscript indices A and D are the two outer spatial phase detectors at the start and end of each instance of the spatial phase sequence. The spatial phase detectors with subscript indices B and C are the interior groups.

The spatial phase detectors $SPD_{1A}$, $SPD_{1B}$, $SPD_{1C}$, and $SPD_{1D}$ output respective spatial phase detector signals $A_1$, $B_1$, $C_1$, and $D_1$. The spatial phase detectors $SPD_{2A}$, $SPD_{2B}$, $SPD_{2C}$, and $SPD_{2D}$ output respective spatial phase detector signals $A_2$, $B_2$, $C_2$, and $D_2$. The spatial phase detectors $SPD_{MA}$, $SPD_{Mu}$, $SPD_{MC}$, and $SPD_{MD}$ output respective spatial phase detector signals $A_M$, $B_M$, $C_M$, and $D_M$.

In some implementations, such as the implementation shown in FIG. 8, N is at least 8 and each subset of spatial phase detectors may comprise four spatial phase detectors having respective spatial phases separated by 90 degrees. In alternative implementations, each subset of spatial phase detectors may comprise three spatial phase detectors having respective spatial phases separated by 120 degrees.

In the implementation shown in FIG. 8, the photodetector configuration 860 includes connections configured to combine spatial phase detector signals corresponding to the same respective spatial phase and to output each such combination as a respective spatial phase position signal. The photodetector configuration 860 is configured to output four spatial phase position signals corresponding to spatial phases separated by 90 degrees. Spatial phase signals with the same letter designation (e.g., $A_1$, $A_2$, and $A_M$) are combined (e.g., summed) to provide spatial phase signals $\Sigma A$, $\Sigma B$, $\Sigma C$, and $\Sigma D$. In alternative implementations, a photodetector configuration may be configured to output three spatial phase position signals corresponding to spatial phases separated by 120 degrees. In either case, spatial phase position signals may be further utilized to determine displacement signals, e.g., through quadrature or three phase signal processing.

In some implementations, a separation distance YSEP between the scale light receptor areas of each adjacent pair of the N spatial phase detectors along the detected fringe motion direction DFMD may be at most 25 micrometers. In some implementations, the separation distance YSEP between the scale light receptor areas of each adjacent pair of the N spatial phase detectors is the same along the detected fringe motion direction DFMD.

FIG. 8 additionally shows a detector axis DA in relation to the measuring axis direction MA. The detector axis is a direction parallel to the specific elongation direction of the spatial phase detectors. In general, it is desirable that the detector axis DA is orthogonal (or close to orthogonal) to the detected fringe motion direction DFMD, although it is not required that it be precisely so, subject to the condition that good displacement signals may be obtained. Therefore, in some implementations the detector axis may be rotated with respect to the measuring axis direction MA by an angle α, particularly if the detected fringe motion direction DFMD is not perpendicular to the measuring axis direction MA. Since it is desirable to use a small illumination fringe yaw angle ψ (as described with respect to FIG. 7), the angle α may be rather small, and in some cases with a very small value of the illumination fringe yaw angle ψ, it may not even be necessary to rotate the detector axis D with respect to the measuring axis direction MA.

FIG. 9A is a detailed schematic diagram of a section of another exemplary photodetector configuration 960A of a contamination and defect resistant optical encoder 900A which is similar to the photodetector configuration shown in FIG. 8. For simplicity, FIG. 9A only shows one subset of spatial phase detectors $S_1$ with two spatial phase detectors $SPD_{1A}$ and $SPD_{1B}$. It should be appreciated that the photodetector configuration 960A may comprise more spatial phase detectors according to the principles disclosed herein, but only two are shown for simplicity. In the implementation shown in FIG. 9A, each of the N spatial phase detectors (e.g., spatial phase detectors $SPD_{1A}$ and $SPD_{1B}$) comprises a photodetector (e.g., photodetectors $PD_{1A}$ and $PD_{1B}$ indicated by dashed lines) covered by a spatial phase mask (e.g., phase masks $PM_{1A}$ and $PM_{1B}$) that blocks the photodetector from receiving the periodic scale light pattern except through openings included in the spatial phase mask. In this case, the scale light receptor areas comprise areas of the photodetectors (e.g., the photodetectors $PD_{1A}$ and $PD_{1B}$) that are exposed through the openings in the respective spatial phase masks (e.g., the spatial phase masks $PM_{1A}$ and $PM_{1B}$). In the implementation shown in FIG. 9A, the scale light receptor areas (i.e., the openings) of the phase mask $PM_{1B}$ are offset relative to the scale light receptor areas of the phase mask $PM_{1A}$ along the detected fringe motion direction DFMD by 90 degrees. It should be appreciated that while the spatial phase masks $PM_{1A}$ and $PM_{1B}$ are schematically illustrated as separate portions in FIG. 9A, in some implementations, they may be conveniently constructed with the same material in the same process to eliminate any potential positioning errors.

FIG. 9B is a detailed schematic diagram of a section of another exemplary photodetector configuration 960B of a contamination and defect resistant optical encoder 900B which is similar to the photodetector configuration 860 shown in FIG. 8. For simplicity, FIG. 9B only shows one subset of spatial phase detectors $S_1$' with two spatial phase detectors $SPD_{1A}$' and $SPD_{1B}$'. It should be appreciated that the photodetector configuration 960B may comprise more spatial phase detectors according to the principles disclosed herein, but only two are shown for simplicity. In the implementation shown in FIG. 9B, each of the N spatial phase detectors (e.g., spatial phase detectors $SPD_{1A}$' and $SPD_{1B}$') comprises a periodic array of electrically interconnected photodetector areas that receive the periodic scale light pattern. In this case, the scale light receptor areas comprise the photodetector areas of the periodic array of photodetectors. In the implementation shown in FIG. 9B, the photodetector areas of the spatial phase detector $SPD_{1B}$' are offset relative to the photodetector areas of the spatial phase detector $SPD_{1A}$' along the detected fringe motion direction DFMD by 90 degrees of spatial phase shift.

In some implementations of photodetectors which are similar to the photodetector configurations 960A or 960B, it is advantageous for each of the N spatial phase detectors to comprise an even number of scale light receptor areas. Zero order components of scale light may cause a variation in intensity between alternating fringes within the scale light. Therefore, having an even number of scale light receptor areas will average out this variation.

Figure 10:
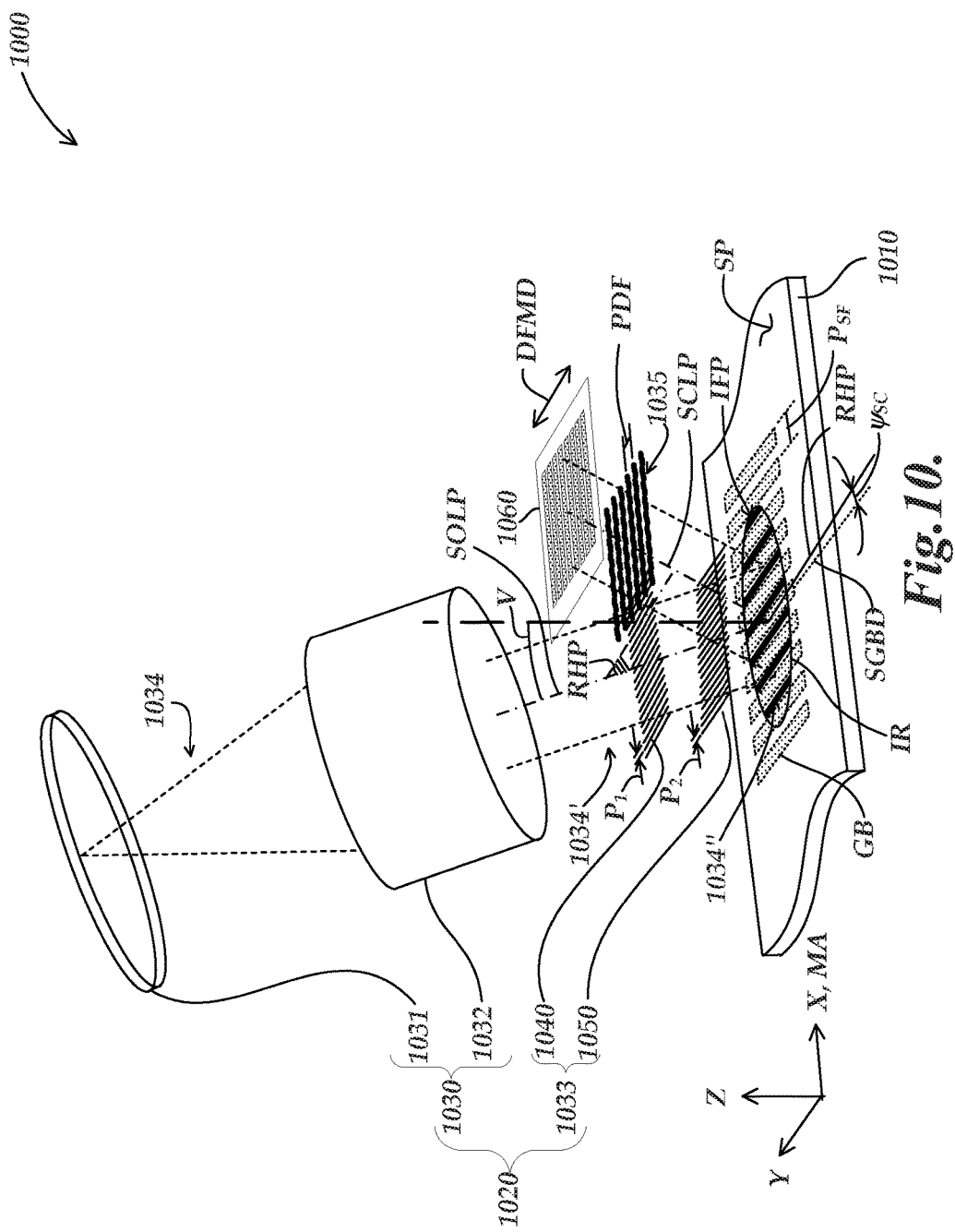
FIG. 10 is a partially schematic diagram of an additional implementation of a contamination and defect resistant optical encoder configuration.

FIG. 10 is a partially schematic diagram of an additional implementation of a contamination and defect resistant optical encoder configuration 1000 for providing displacement signals. In the encoder configuration 1000, the periodic scale light pattern 1035 that is detected comprises a detector fringe pattern 1035, which includes bands that are oriented to extend over a relatively longer dimension along a measuring axis direction MA, and that move transverse to the measuring axis direction along a detected fringe motion direction DFMD during optical encoder displacement.

The optical encoder configuration 1000 comprises a scale 1010, an illumination source 1020, and a photodetector configuration 1060. The scale 1010 extends along a measuring axis direction MA, and comprises a scale grating comprising grating bars GB arranged in a scale plane SP that is nominally parallel to the measuring axis direction MA. The scale grating bars GB are narrow along the measuring axis direction MA and elongated along a scale grating bar direction SGBD transverse to the measuring axis direction MA, and are arranged periodically at a scale pitch $P_{SF}$ along the measuring axis direction MA. The illumination source 1020 comprises a light source 1030 that outputs light 1034', and a structured illumination generating portion 1033 configured to input the light 1034' and output structured illumination 1034" along a source light path SOLP to an illumination region IR at the scale plane SP, where the structured illumination 1034" comprises an illumination fringe pattern IFP comprising fringes that are narrow along the measuring axis direction MA and elongated along an illumination fringe direction IFD oriented transverse to the measuring axis direction MA. The light source 1030 comprises a point source 1031 and a collimating lens 1032. The point source 1031 outputs light 1034 to the collimating lens which then collimates the light 1034 to provide the light 1034'.

The photodetector configuration 1060 comprises a set of N spatial phase detectors arranged periodically at a detector pitch PD (as shown in detail FIG. 6A and FIG. 6B) along a detected fringe motion direction DFMD transverse to the measuring axis direction MA, wherein each spatial phase detector is configured to provide a respective spatial phase detector signal and at least a majority of the respective spatial phase detectors extend over a relatively longer dimension along the measuring axis direction MA and are relatively narrow along the detected fringe motion direction DFMD transverse to the measuring axis, and the set of N spatial phase detectors are arranged in a spatial phase sequence along the detected fringe motion direction DFMD, as previously described in greater detail with reference to FIGS. 8, 9A and 9B.

In a similar manner as the encoder configuration 500, the scale 1010 is configured to input the illumination fringe pattern at the illumination region IR and output scale light components along a scale light path SCLP to form the detector fringe pattern 1035 at the photodetector configuration 1060. The detector fringe pattern 1035 comprises periodic high and low intensity bands that extend over a relatively longer dimension along the measuring axis direction MA and are relatively narrow and periodic with a detected fringe period PDF along the detected fringe motion direction DFMD transverse to the measuring axis direction MA, as previously described in greater detail with reference to FIG. 6.

The scale grating bar direction SGBD is oriented at a nonzero yaw angle $\psi_{SC}$ relative to a readhead plane RHP defined by the source light path SOLP and a scale light path SCLP.

The structured illumination generating portion 1033 comprises a first illumination source diffraction grating 1040 and a second illumination source diffraction grating 1050, which are shown in more detail in FIG. 11A and FIG. 11B. In some implementations, the first illumination source diffraction grating 1040 and the second illumination source diffraction grating 1050 may be phase gratings.

The detected fringe period PDF and the detected fringe motion direction DFMD transverse to the measuring axis direction MA depend at least partially on the nonzero yaw angle $\psi_{SC}$, as outlined previously with reference to FIG. 7. The high and low intensity bands move along the detected fringe motion direction DFMD transverse to the measuring axis direction MA as the scale 1010 displaces along the measuring axis direction MA. The photodetector configuration 1060 is configured to detect a displacement of the high and low intensity bands along the detected fringe motion direction DFMD transverse to the measuring axis direction MA and provide respective spatial phase displacement signals that are indicative of the scale displacement.

FIG. 11A is a schematic diagram of the first illumination source diffraction grating 1040. FIG. 11B is a schematic diagram of the second illumination source diffraction grating 1050. In various implementations, it is desirable to configure the optical encoder configuration 1000 to minimize errors in displacement signals that arise from gap variations between the scale 1010, the illumination source 1020, and the photodetector configuration 1060.

As shown in FIG. 11A, the first illumination source diffraction grating 1040 comprises first index grating bars arranged periodically at a first index pitch $P_1$ in a first index plane, wherein the first index grating bars are narrow along the measuring axis direction, and elongated along a first grating bar direction which is transverse to the measuring axis direction and rotated by an angle $\psi_1$ with respect to the readhead plane RHP. As shown in FIG. 11B, the second illumination source diffraction grating 1050 comprises second illumination source grating bars arranged periodically at a second index pitch $P_2$ in a second index plane which is parallel to the first index plane, wherein the second index grating bars are narrow along the measuring axis direction, and elongated along a second index grating bar direction which is transverse to the measuring axis direction and rotated by an angle $\psi_2$ with respect to the readhead plane RHP.

In various optical encoders such as the optical encoder configuration 500, dynamic gap errors may arise from scale waviness, which changes a distance between the illumination portion 520 and the scale 510 along the source light path SOLP. A change in an optical path length along the scale light path SCLP causes changes in the relative phases of interfering beams which contribute to the detector fringe pattern 1035. In various applications $\psi_1$ and $\psi_2$ may be selected such that they give a dynamic gap error which is equal in magnitude and opposite in sign. The phases of two interfering rays of interfering beams which contribute to the detector fringe pattern 1035 may be expressed by $\Phi_+$ and $\Phi_-$. The light output by the light source 1030 has a wavelength $\lambda$. A dynamic gap error DGE relates to a gap variation Δg along a direction normal to the measuring axis direction MA and the scale grading bar direction SGBD (i.e., the Z direction) by the expression:

$$DGE = \frac{P_{SF}}{4\pi} \frac{\partial(\Phi_+ - \Phi_-)}{\partial \Delta g} \quad (3)$$

More specifically, the differential term is given by the expression $$\frac{\partial(\Phi_+ - \Phi_-)}{\partial \Delta g} = \Omega\left[\frac{-\lambda}{P_1}\sin(\psi_1) + \frac{\lambda}{P_2}\sin(\psi_2)\right] - \frac{4\pi}{P_{SF}}\sin(\psi_{sc})\tan(V) \quad (4)$$

where a factor $\Omega$ is defined by the expression:

$$\Omega = \frac{4\pi\lambda}{P_{SF}^2}\sin(V)\left(\left(\cos^2(V) - \frac{\lambda^2}{P_{SF}^2}\right)^{-3/2} - \cos^{-3}(V)\right) + \frac{8\pi}{\lambda}\tan(V). \quad (5)$$

In equation 4, the first term $$\Omega\left[\frac{-\lambda}{P_1}\sin(\psi_1) + \frac{\lambda}{P_2}\sin(\psi_2)\right]$$

is in error component that comes from the yaw of each of the first illumination source diffraction grating 1040 and the second illumination source diffraction grating 1050. The second term $$\frac{4\pi}{P_{SF}}\sin(\psi_{sc})\tan(V)$$

is in error component that comes from the yaw angle $\psi_{SC}$. By deliberately introducing error components with the angle $\psi_1$ and the angle $\psi_2$, it is possible to compensate error components from the second term.

In some implementations, the scale 1010 comprises a scale grating which is a reflective grating. As shown in FIG. 10, the source light path SOLP may be oriented at an angle V with respect to a direction normal to the scale plane. In order to provide the desired detected fringe period PDF, the yaw angle $\psi_{SC}$ may satisfy the expression:

$$\psi_{sc} = \sin^{-1}\left[P_{SF}\left(\frac{1}{2PDF} - \frac{\sin(\psi_1)}{P_1} + \frac{\sin(\psi_2)}{P_2}\right)\right]. \quad (6)$$

In order to cancel out the dynamic gap error DGE as shown in equation 3, the angle $\psi_1$ and the angle $\psi_2$ may satisfy the expression:

$$\frac{-\sin(\psi_1)}{d_1} + \frac{\sin(\psi_2)}{d_2} = \frac{2\pi\tan(V)\cos(V)}{PDF(\Omega\lambda - 4\pi\tan V)} \quad (7)$$

In a typical example of an optical encoder configured in a similar manner as the optical encoder configuration 500 with a $P_{SF}$ value of 2 micrometers, a $P_1$ value of 2 micrometers, a $P_2$ value of 1 micrometer, a V value of 30 degrees, a $\lambda$ value of 660 nanometers, and a PDF value of 120 micrometers, $\psi_{SC}$ may then have a value of 0.48 degrees. This may give a dynamic gap error of 4.8 nanometers of position measurement error per micrometer of gap variation Δg. In a typical example of an optical encoder configured in a similar manner as the optical encoder configuration 1000, with the same parameters as above, $\psi_{SC}$ may be 0.94 degrees, $\psi_1$ may be −0.46 degrees, and $\psi_2$ may be 0.0 degrees. The yaw angle $\psi_1$ may contribute a dynamic gap error component of −9.4 nanometers of position measurement error per micrometer of gap variation Δg, and the yaw angle $\psi_2$ may contribute a dynamic gap error component of 9.4 nanometers of position measurement error per micrometer of gap variation Δg. The two dynamic gap errors balance out to provide a net zero dynamic gap error.

Figure 12:
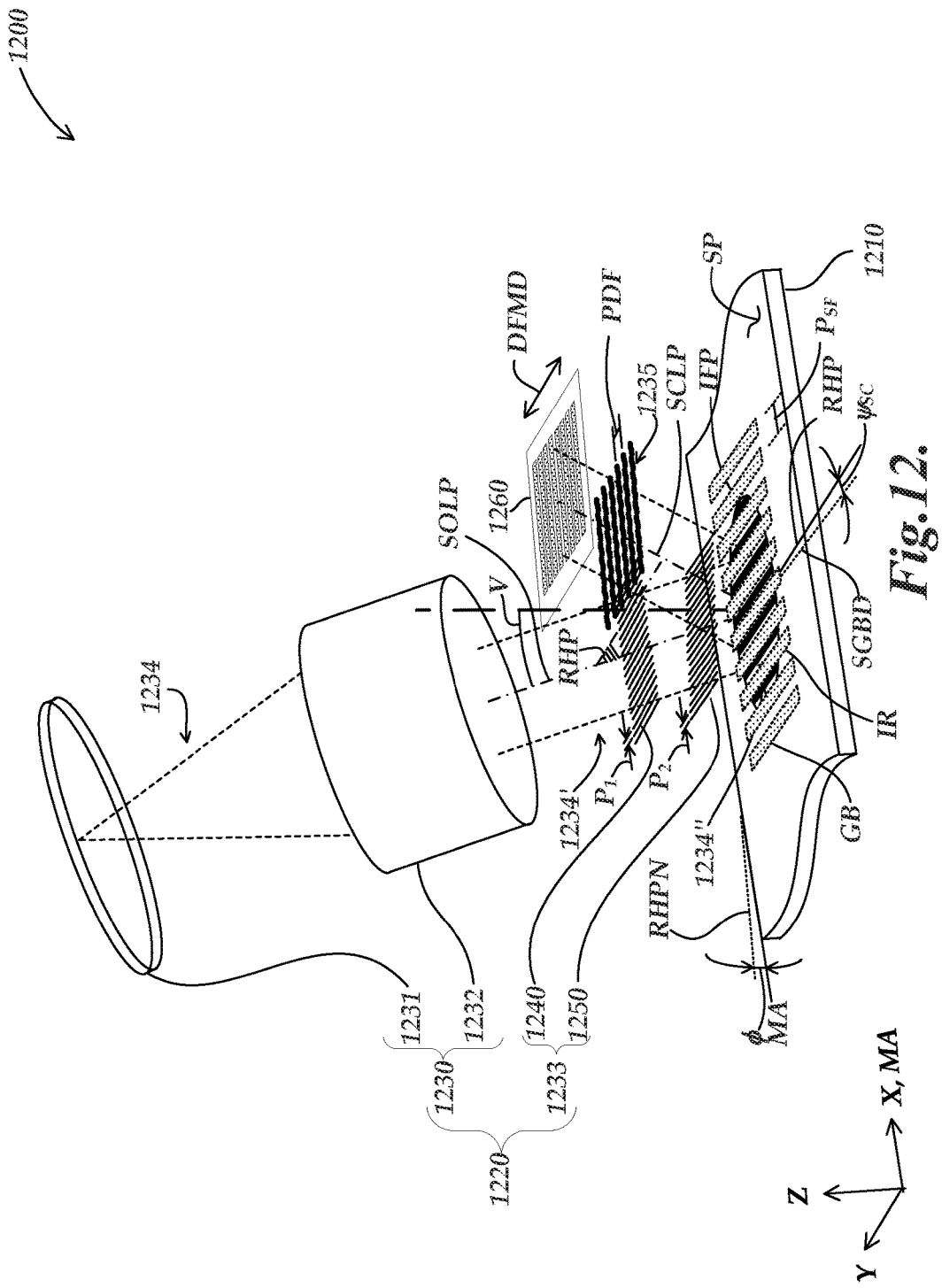
FIG. 12 is a partially schematic diagram of an additional implementation of a contamination and defect resistant optical encoder configuration.

FIG. 12 is a partially schematic diagram of an additional implementation of a contamination and defect resistant optical encoder configuration 1200 for providing displacement signals. In the encoder configuration 1200, the periodic scale light pattern 1235 that is detected comprises a detector fringe pattern, which includes bands that are oriented to extend over a relatively longer dimension along a measuring axis direction MA, and that move transverse to the measuring axis direction MA along a detected fringe motion direction DFMD during optical encoder displacement. The scale light pattern 1235 may be provided by an optical encoder similar to the optical encoder configuration 1000 outlined with reference to FIG. 10.

The optical encoder configuration 1200 comprises a scale 1210, an illumination source 1220, and a photodetector configuration 1260. The scale 1210 extends along a measuring axis direction MA, and comprises a scale grating comprising grating bars GB arranged in a scale plane SP that is nominally parallel to the measuring axis direction MA. The scale grating bars GB are narrow along the measuring axis direction MA and elongated along a scale grating bar direction SGBD transverse to the measuring axis direction MA, and are arranged periodically at a scale pitch $P_{SF}$ along the measuring axis direction MA. The illumination source 1220 comprises a light source 1230 that outputs light 1234', and a structured illumination generating portion 1233 configured to input the light 1234' and output structured illumination 1234" along a source light path SOLP to an illumination region IR at the scale plane SP, where the structured illumination 1234" comprises an illumination fringe pattern IFP comprising fringes that are narrow along the measuring axis direction MA and elongated along an illumination fringe direction IFD oriented transverse to the measuring axis direction MA. The light source 1230 comprises a point source 1231 and a collimating lens 1232. The point source 1231 outputs light 1234 to the collimating lens which then collimates the light 1234 to provide the light 1234'.

The photodetector configuration 1260 comprises a set of N spatial phase detectors arranged periodically at a detector pitch PD (similar to the photodetector configuration 860 as shown in detail FIG. 8) along a detected fringe motion direction DFMD transverse to the measuring axis direction MA, wherein each spatial phase detector is configured to provide a respective spatial phase detector signal and at least a majority of the respective spatial phase detectors extend over a relatively longer dimension along the measuring axis direction MA and are relatively narrow along the detected fringe motion direction DFMD transverse to the measuring axis direction MA, and the set of N spatial phase detectors are arranged in a spatial phase sequence along the detected fringe motion direction DFMD, as previously described in greater detail with reference to FIGS. 8, 9A and 9B.

In a similar manner as the encoder configuration 500, the scale 1210 is configured to input the illumination fringe pattern at the illumination region IR and output scale light components along a scale light path SCLP to form the scale light pattern 1235 at the photodetector configuration 1260. The scale light pattern 1235 comprises periodic high and low intensity bands that extend over a relatively longer dimension along the measuring axis direction MA and are relatively narrow and periodic with a detected fringe period PDF along the detected fringe motion direction DFMD transverse to the measuring axis direction MA, as previously described in greater detail with reference to FIG. 6A and FIG. 6B.

The scale grating bar direction SGBD is oriented at a nonzero yaw angle $\psi_{SC}$ relative to a readhead plane RHP defined by the source light path SOLP and a scale light path SCLP.

The detected fringe period PDF and the detected fringe motion direction DFMD transverse to the measuring axis direction MA depend at least partially on the nonzero yaw angle $\psi_{SC}$, as outlined previously with reference to FIG. 7. The high and low intensity bands move along the detected fringe motion direction DFMD transverse to the measuring axis direction MA as the scale 1210 displaces along the measuring axis direction MA. The photodetector configuration 1260 is configured to detect a displacement of the high and low intensity bands along the detected fringe motion direction DFMD transverse to the measuring axis direction MA and provide respective spatial phase displacement signals that are indicative of the scale displacement.

A normal RHPN of the readhead plane RHP is oriented with a non-zero pitch angle $\phi$ relative to the measuring axis direction MA.

Figure 13A:
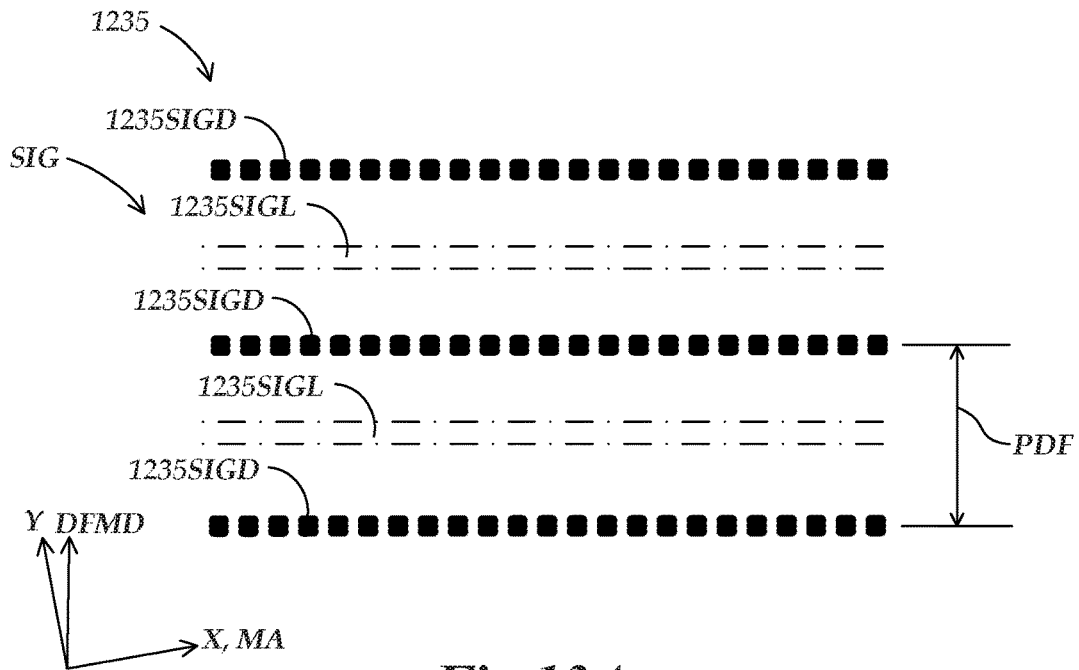
FIG. 13A is a schematic diagram representing a first view of scale light components that form a detector fringe pattern proximate to a photodetector configuration.

FIG. 13A is a schematic diagram representing a first view of scale light components that form a scale light pattern 1235 proximate to a photodetector configuration which is similar to the photodetector configuration 1260 in FIG. 12. More specifically, FIG. 13A shows a cross section of a portion SIG of the scale light pattern 1235 in a plane defined by a measuring axis direction MA and a Y direction, which is proximate to the photodetector configuration 1260. The portion SIG of the scale light pattern 1235 is a set of fringes formed by the overlap of scale light components SL1 and SL2 which may be understood by reference to FIG. 6B. The portion SIG of the scale light pattern 1235 comprises dark or low intensity interference bands 1235SIGD indicated by bold lines and light or high intensity interference bands 1235SIGL indicated by dashed outlines. The portion SIG is analogous to the detector fringe pattern 635, which provides the portion of the scale light pattern 1235 which results in spatial phase displacement signals that are indicative of the scale displacement. More specifically, the photodetector configuration 1260 is configured to detect a displacement of the interference bands 1235SIGD and 1235SIGL along the detected fringe motion direction DFMD transverse to the measuring axis direction MA and provide respective spatial phase displacement signals that are indicative of the scale displacement.

In various implementations, the detector fringe pattern 635 may additionally include zero order light which causes variations in intensity of the high intensity interference bands 635L. More specifically, the interference between zero order scale light and the scale light components SL1 and SL2 results in fringes of low and high intensity interference bands which are parallel to the low intensity interference bands 635D and the high intensity interference bands 635L. This results in fringes in the detector fringe pattern 635 which have a pattern of variation in alternating fringes, which results in short range errors in spatial phase displacement signals. The contamination and defect resistant optical encoder configuration 1200 is configured to suppress these errors as described below. More specifically, the interference between zero order scale light and light which would correspond to the scale light components SL1 and SL2 shown in FIG. 6B results in fringes of dark and light intensity bands which are parallel to light which would correspond to the scale light components SL1 and SL2 and which move along the detected fringe motion direction DFMD during optical encoder displacement It should be appreciated that FIGS. 13A-D show a portion of the scale light pattern 1235 in a frame of reference aligned with the photodetector configuration 1260. In general, a photodetector configuration such as the photodetector configuration 1260 should be oriented such that spatial phase detectors are aligned with the fringe pattern defined by the low and high intensity interference bands 1235SIGD and 1235SIGL along the detected fringe motion direction DFMD, which is transverse to the measuring axis direction MA, but not precisely aligned with the Y direction.

Figure 13B:
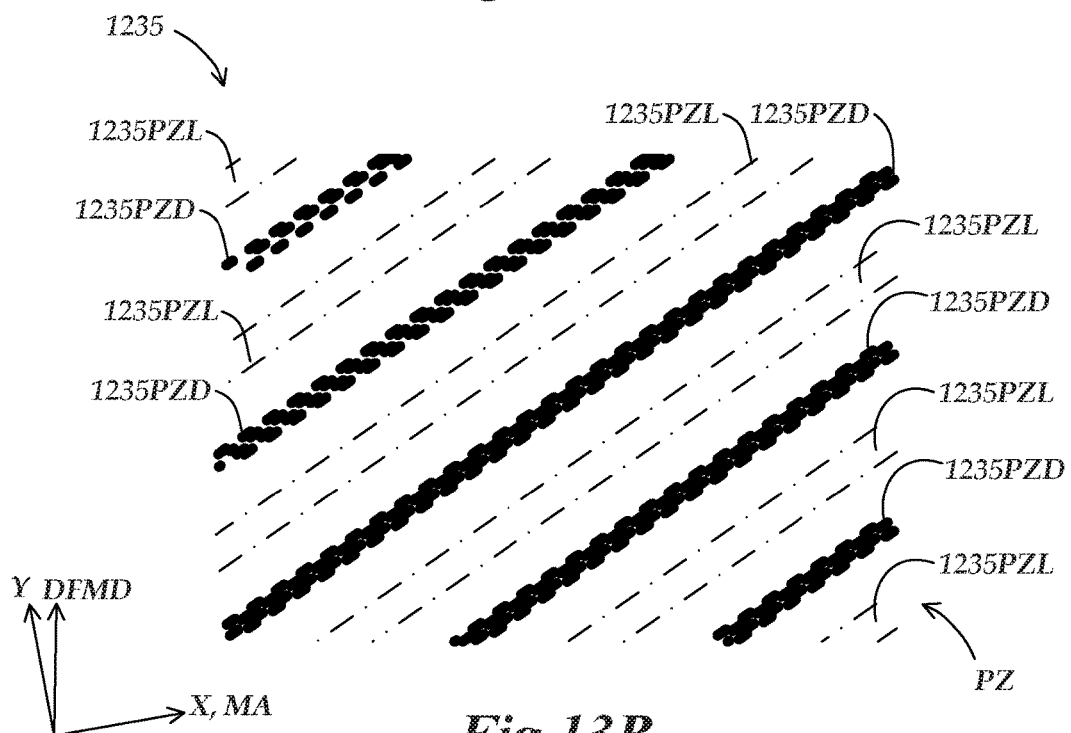
FIG. 13B is a schematic diagram representing a second view of scale light components that form a detector fringe pattern proximate to a photodetector configuration.

FIG. 13B is a schematic diagram representing a second view of scale light components that form a scale light pattern 1235 proximate to a photodetector configuration which is similar to the photodetector configuration 1260 in FIG. 12. More specifically, FIG. 13B shows a cross section of a portion PZ of the scale light pattern 1235 in a plane defined by a measuring axis direction MA and a Y direction, which is proximate to the photodetector configuration 1260. The portion PZ of the scale light pattern 1235 is a set of fringes formed by the overlap of a zero-order scale light component and the scale light component SL1. The portion PZ of the scale light pattern 1235 comprises dark or low intensity interference bands 1235PZD indicated by bold lines and light or high intensity interference bands 1235PZL indicated by dashed outlines.

Because of the non-zero pitch angle $\phi$, the interference bands 1235PZD and 1235PZL are oriented such that they are not aligned along the detected motion fringe direction DMFD, and thus, they are not aligned with the interference bands 1235SIGD and interference bands 1235SIGL.

Figure 13C:
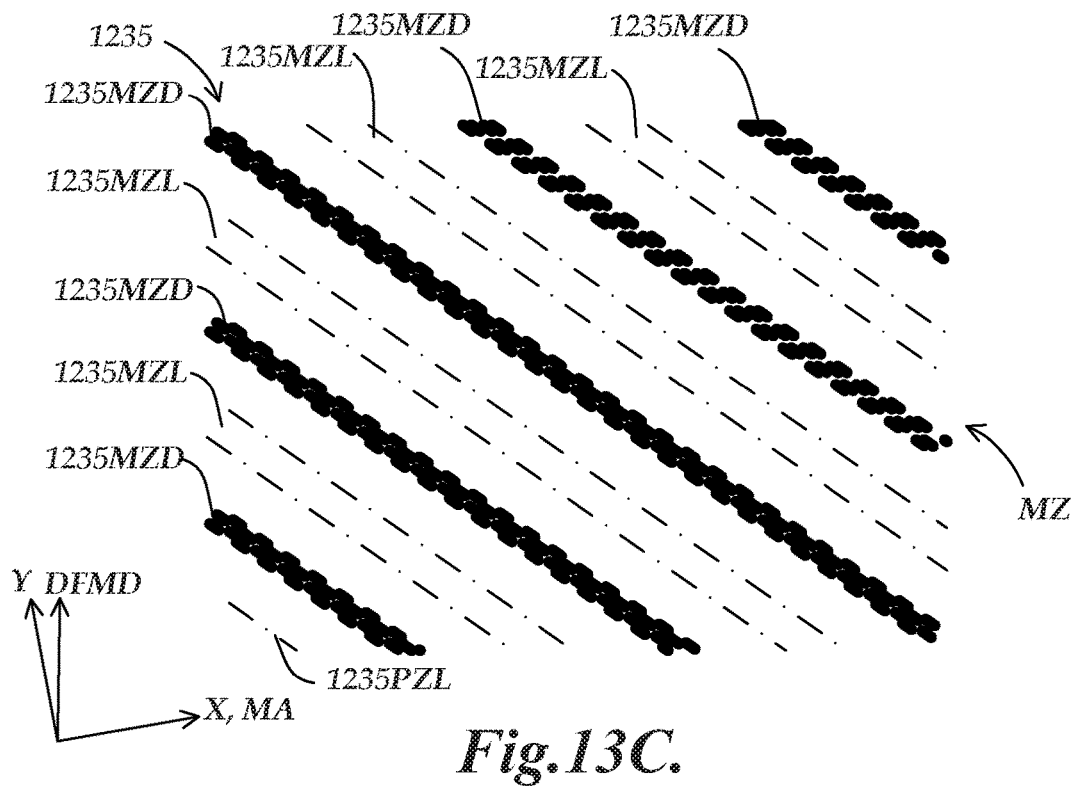
FIG. 13C is a schematic diagram representing a third view of scale light components that form a detector fringe pattern proximate to a photodetector configuration.

FIG. 13C is a schematic diagram representing a third view of scale light components that form a scale light pattern 1235 proximate to a photodetector configuration which is similar to the photodetector configuration 1260 in FIG. 12. More specifically, FIG. 13C shows a cross section of a portion MZ of the scale light pattern 1235 in a plane defined by a measuring axis direction MA and a Y direction, which is proximate to the photodetector configuration 1260. The portion MZ of the scale light pattern 1235 is a set of fringes formed by the overlap of a zero order scale light component and the scale light component SL2. The portion MZ of the scale light pattern 1235 comprises dark or low intensity interference bands 1235MZD indicated by bold lines and light or high intensity interference bands 1235MZL indicated by dashed outlines.

Because of the non-zero pitch angle $\phi$, the interference bands 1235MZD and 1235MZL are oriented such that they are not aligned along the detected motion fringe direction DMFD, and thus, they are not aligned with the interference bands 1235SIGD and interference bands 1235SIGL.

Figure 13D:
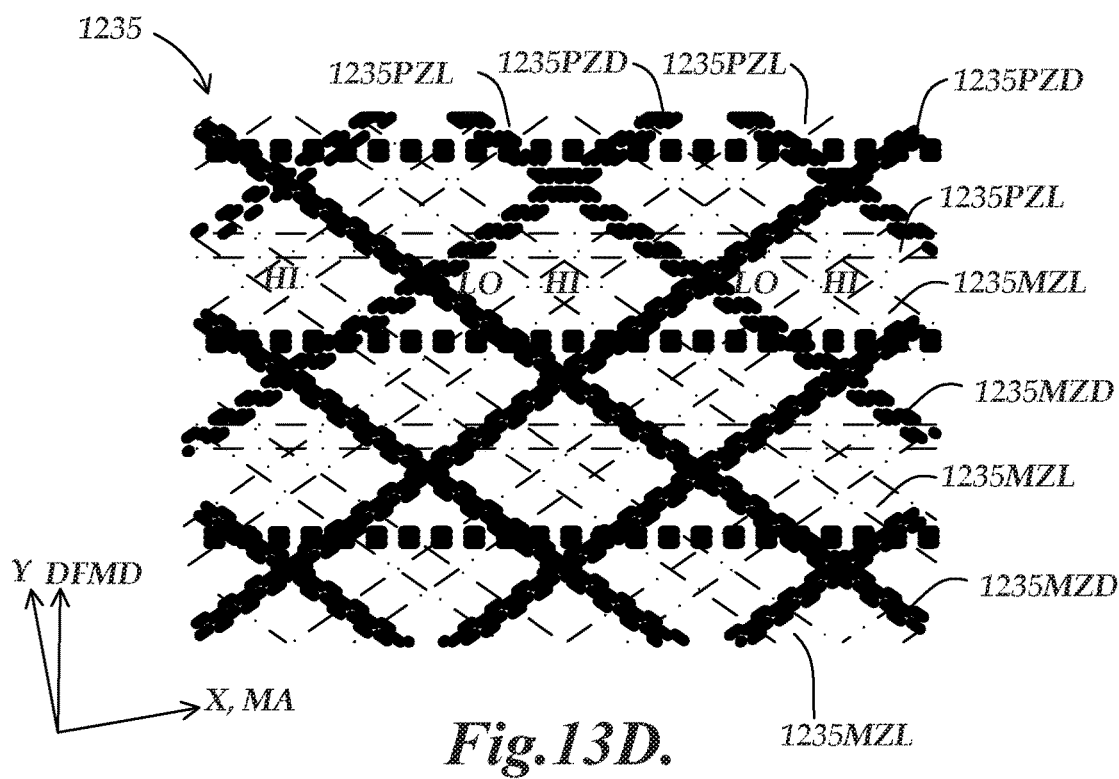
FIG. 13D is a schematic diagram representing a fourth view of scale light components that form a detector fringe pattern proximate to a photodetector configuration.

FIG. 13D is a schematic diagram representing a fourth view of scale light components that form a scale light pattern 1235 proximate to a photodetector configuration which is similar to the photodetector configuration 1260 in FIG. 12. More specifically, FIG. 13D shows a cross section of each of the portions PZ, MZ and SIG of the scale light 1235. If the pitch angle ϕ were zero, the interference bands of the portions PZ and MZ would not be oriented differently in angle relative to the detected fringe motion direction DFMD, but would instead be parallel to the interference bands 1235SIGD and 1235SIGL, which would result in variation in intensity between alternate interference bands high interference bands 1235SIGL of the portion SIG, which would cause short range errors in spatial phase displacement signals. However, as shown in FIG. 13D, in the case of a nonzero pitch angle ϕ, low intensity interference bands 1235PZD and 1235MZD of the portions PZ and MZ overlap in low intensity regions LO and high intensity interference bands 1235PZL and 1235MZL overlap in high intensity regions HI. The regions LO and HI are aligned along a direction transverse to the detected fringe motion direction DFMD. The intensity of the 1235 in regions LO and HI averages out along the direction transverse to the detected fringe motion direction DFMD which suppresses variation in intensity between alternating fringes within the scale light 1235 along the detected fringe motion direction DFMD. This averaging reduces short range errors in spatial phase displacement signals which are caused by zero order scale light which interferes with the portion SIG of the scale light 1235.

In some implementations of the contamination and resistant optical encoder 1200, ϕ may be greater than 0.3 degrees and less than 2.0 degrees.

In some implementations of the contamination and resistant optical encoder 1200, each of the N spatial phase detectors may comprise an even number of scale light receptor areas.

In some implementations of the contamination and resistant optical encoder 1200, the structured illumination generating portion 1233 may comprise a first illumination source diffraction grating (e.g. the first illumination source diffraction grating 1040) and a second illumination source diffraction grating (e.g. the second illumination source diffraction grating 1050). The first illumination source diffraction grating may comprise first illumination source grating bars arranged periodically at a first index pitch $P_1$ in a first index plane, wherein the first index grating bars are narrow along the measuring axis direction, and elongated along a first grating bar direction which is transverse to the measuring axis direction and rotated by an angle $\psi_1$ with respect to the readhead plane RHP. The second illumination source diffraction grating may comprise second illumination source grating bars arranged periodically at a second index pitch $P_2$ in a second index plane which is parallel to the first index plane, wherein the second index grating bars are narrow along the measuring axis direction, and elongated along a second index grating bar direction which is transverse to the measuring axis direction and rotated by an angle $\psi_2$ with respect to the readhead plane RHP. In some implementations (e.g. as previously described with respect to FIG. 10), the scale 1210 may comprise a scale grating which is a reflective grating, the source light path SOLP may be oriented at an angle V with respect to a direction normal to the scale plane SP, and the yaw angle $\psi_{SC}$ may satisfy equation (6). In some implementations, the light output by the light source 1230 may have a wavelength λ, a factor Ω may be defined by equation (5), and the angle $\psi_1$ and the angle $\psi_2$ may satisfy equation (7). In some implementations, the first illumination source light diffraction grating and the second illumination source light diffraction grating may be phase gratings. In some implementations, the detected fringe period PDF may be at least 40 micrometers.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All the U.S. patents and U.S. patent applications referred to in this specification are hereby incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A contamination and defect resistant optical encoder configuration for providing displacement signals, comprising:

a scale that extends along a measuring axis direction, the scale comprising a scale grating comprising scale grating bars arranged in a scale plane that is nominally parallel to the measuring axis direction, wherein the scale grating bars are narrow along the measuring axis direction and elongated along a scale grating bar direction transverse to the measuring axis direction, and are arranged periodically at a scale pitch $P_{SF}$ along the measuring axis direction;

an illumination source comprising a light source that outputs light, and a structured illumination generating portion configured to input the light and output structured illumination along a source light path SOLP to an illumination region at the scale plane where the structured illumination comprises an illumination fringe pattern comprising fringes that are narrow along the measuring axis direction and elongated along an illumination fringe direction oriented transverse to the measuring axis direction; and a photodetector configuration comprising a set of N spatial phase detectors arranged periodically at a detector pitch PD along a detected fringe motion direction transverse to the measuring axis direction, wherein each spatial phase detector is configured to provide a respective spatial phase detector signal and at least a majority of the respective spatial phase detectors extend over a relatively longer dimension along the measuring axis direction and are relatively narrow along the detected fringe motion direction transverse to the measuring axis direction, and the set of N spatial phase detectors are arranged in a spatial phase sequence along the detected fringe motion direction;

wherein:
the scale grating is configured to input the illumination fringe pattern at the illumination region and output scale light along a scale light path SCLP that forms a fringe pattern at the photodetector configuration, the fringe pattern comprising periodic high and low intensity bands that extend over a relatively longer dimension along the measuring axis direction and are relatively narrow and periodic with a detected fringe period PDF along the detected fringe motion direction transverse to the measuring axis direction;

the scale grating bar direction is oriented at a nonzero yaw angle $\psi_{SC}$ relative to a readhead plane RHP defined by the source light path SOLP and the scale light path SCLP;

the detected fringe period PDF and the detected fringe motion direction transverse to the measuring axis direction depend at least partially on the nonzero yaw angle $\psi_{SC}$;

the high and low intensity bands move along the detected fringe motion direction transverse to the measuring axis direction as the scale grating displaces along the measuring axis direction;

a normal of the readhead plane RHP is oriented with a non-zero pitch angle $\phi$ relative to the measuring axis direction; and the photodetector configuration is configured to detect a displacement of the high and low intensity bands along the detected fringe motion direction transverse to the measuring axis direction and provide respective spatial phase displacement signals that are indicative of the scale displacement.

2. The contamination and defect resistant optical encoder configuration of claim 1, wherein $\phi$ is greater than 0.3 degrees and less than 2.0 degrees.

3. The contamination and defect resistant optical encoder configuration of claim 1, wherein each of the N spatial phase detectors comprises an even number of scale light receptor areas.

4. The contamination and defect resistant optical encoder configuration of claim 1, wherein:

the structured illumination generating portion comprises:

a first illumination source light diffraction grating comprising first illumination source grating bars arranged periodically at a first index pitch $P_1$ in a first index plane, wherein the first index grating bars are narrow along the measuring axis direction, and elongated along a first grating bar direction which is transverse to the measuring axis direction and rotated by an angle $\psi_1$ with respect to the readhead plane RHP; and a second illumination source light diffraction grating comprising second illumination source grating bars arranged periodically at a second index pitch $P_2$ in a second index plane which is parallel to the first index plane, wherein the second index grating bars are narrow along the measuring axis direction, and elongated along a second index grating bar direction which is transverse to the measuring axis direction and rotated by an angle $\psi_2$ with respect to the readhead plane RHP.

5. The contamination and defect resistant optical encoder configuration of claim 4, wherein:

the scale grating is a reflective grating;
the source light path SOLP is oriented at an angle V with respect to a direction normal to the scale plane; and
the yaw angle $\psi_{SC}$ satisfies the relation:

$$\psi_{sc} = \sin^{-1}\left[P_{SF}\left(\frac{1}{2PDF} - \frac{\sin(\psi_1)}{P_1} + \frac{\sin(\psi_2)}{P_2}\right)\right].$$

6. The contamination and defect resistant optical encoder configuration of claim 4, wherein:

the light output by the light source has a wavelength $\lambda$;
a factor $\Omega$ is defined by the expression:

$$\Omega = \frac{4\pi\lambda}{P_{SF}^2}\sin(V)\left(\left(\cos^2(V) - \frac{\lambda^2}{P_{SF}^2}\right)^{-3/2} - \cos^{-3}(V)\right) + \frac{8\pi}{\lambda}\tan(V);$$

and
the angle $\psi_1$ and the angle $\psi_2$ satisfy the expression:

$$\frac{-\sin(\psi_1)}{d_1} + \frac{\sin(\psi_2)}{d_2} = \frac{2\pi\tan(V)\cos(V)}{PDF(\Omega\lambda - 4\pi\tan V)}.$$

7. The contamination and defect resistant optical encoder configuration of claim 4, wherein the first illumination source light diffraction grating and the second illumination source light diffraction grating are phase gratings.

8. The contamination and defect resistant optical encoder configuration of claim 4, wherein the detected fringe period PDF is at least 40 micrometers.

9. The contamination and defect resistant optical encoder configuration of claim 4, wherein:

the scale grating is a reflective grating;
the source light path SOLP is oriented at an angle V with respect to a direction normal to the scale plane;
the light output by the light source has a wavelength $\lambda$;
a factor $\Omega$ is defined by the expression:

$$\Omega = \frac{4\pi\lambda}{P_{SF}^2}\sin(V)\left(\left(\cos^2(V) - \frac{\lambda^2}{P_{SF}^2}\right)^{-3/2} - \cos^{-3}(V)\right) + \frac{8\pi}{\lambda}\tan(V);$$

and
the angle $\psi_1$ and the angle $\psi_2$ satisfy the expression:

$$\frac{-\sin(\psi_1)}{d_1} + \frac{\sin(\psi_2)}{d_2} = \frac{2\pi\tan(V)\cos(V)}{PDF(\Omega\lambda - 4\pi\tan V)}.$$

* * * * *